United States Patent
Kato

(10) Patent No.: US 11,915,096 B2
(45) Date of Patent: Feb. 27, 2024

(54) DETECTION SYSTEM

(71) Applicant: Japan Display Inc., Tokyo (JP)

(72) Inventor: Hirofumi Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 21 days.

(21) Appl. No.: 17/885,716

(22) Filed: Aug. 11, 2022

(65) Prior Publication Data

US 2023/0056997 A1 Feb. 23, 2023

(30) Foreign Application Priority Data

Aug. 18, 2021 (JP) ................................ 2021-133512

(51) Int. Cl.
*G06K 7/14* (2006.01)
*G06V 40/13* (2022.01)

(52) U.S. Cl.
CPC ....... *G06K 7/1417* (2013.01); *G06V 40/1318* (2022.01)

(58) Field of Classification Search
None
See application file for complete search history.

(56) References Cited

U.S. PATENT DOCUMENTS

| 2009/0027358 | A1* | 1/2009 | Hosono ................. G06F 3/0421 345/175 |
| 2018/0012069 | A1 | 1/2018 | Chung et al. |
| 2020/0307683 | A1* | 10/2020 | Fujita ..................... B62D 5/046 |

FOREIGN PATENT DOCUMENTS

| JP | 2009-032005 A | 2/2009 |
| JP | 2018116031 A * | 7/2018 |

* cited by examiner

*Primary Examiner* — Kristy A Haupt
(74) *Attorney, Agent, or Firm* — K&L Gates LLP

(57) ABSTRACT

According to an aspect, a detection system includes: a sensor provided with a plurality of photosensors in a detection area; a controller configured to control the sensor; and a data storage configured to store correction value data including correction values for detection values of the photosensors and identification codes of a plurality of the sensors in such a manner that the identification codes are associated one-to-one with the correction value data. The controller is configured to acquire the correction value data corresponding to the identification code of the sensor from the data storage and correct the detection values of the photosensors based on the acquired correction value data.

15 Claims, 25 Drawing Sheets

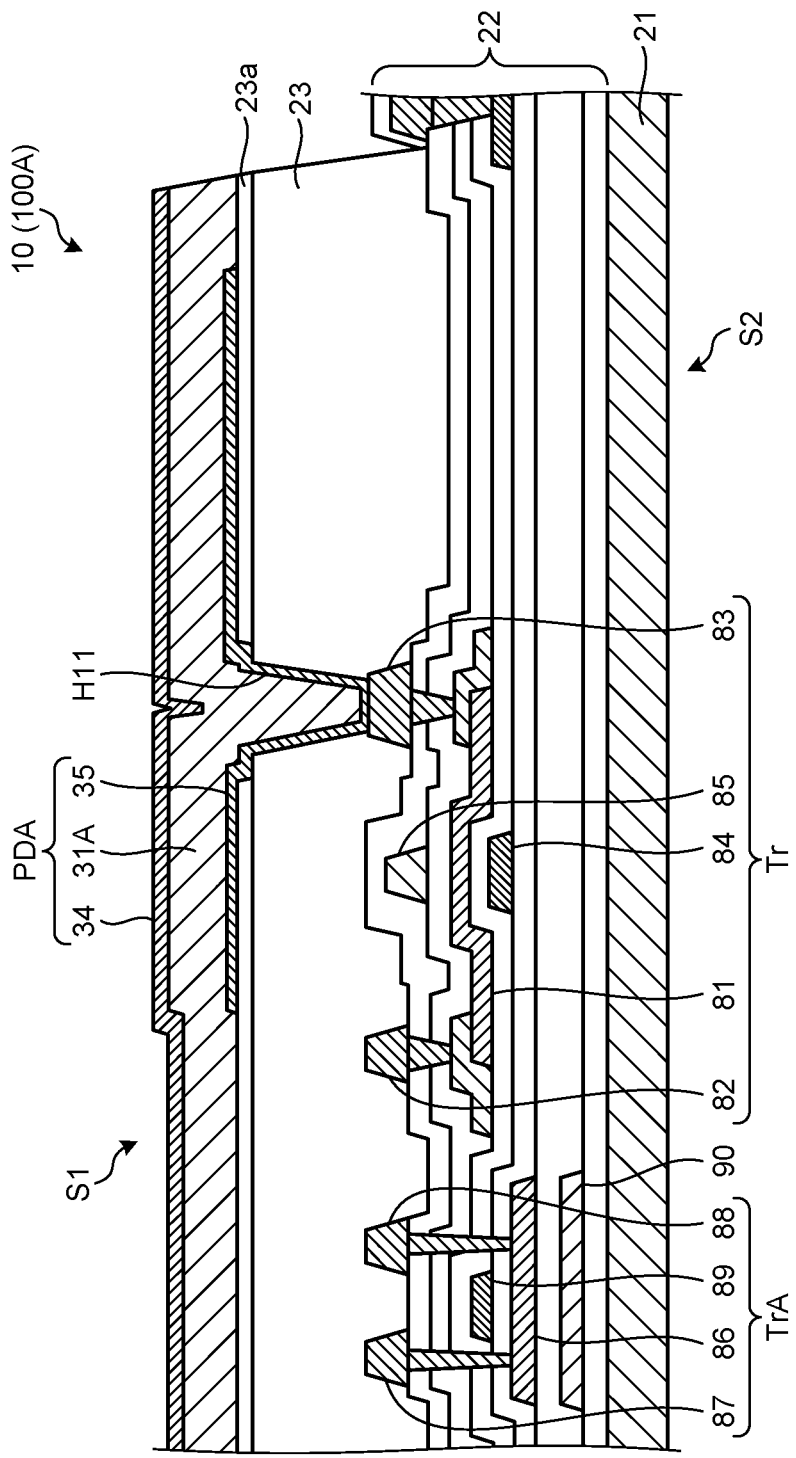

FIG.13

| L (I) | | | | | |
|---|---|---|---|---|---|
| ΔL (I) (1, 1) | ΔL (I) (2, 1) | ⋯ | ΔL (I) (n, 1) | ⋯ | ΔL (I) (N-1, 1) | ΔL (I) (N, 1) |
| ΔL (I) (1, 2) | ΔL (I) (2, 2) | ⋯ | ΔL (I) (n, 2) | ⋯ | ΔL (I) (N-1, 2) | ΔL (I) (N, 2) |
| ⋮ | ⋮ | ⋯ | ⋮ | ⋯ | ⋮ | ⋮ |
| ΔL (I) (1, m) | ΔL (I) (2, m) | ⋯ | ΔL (I) (n, m) | ⋯ | ΔL (I) (N-1, m) | ΔL (I) (N, m) |
| ⋮ | ⋮ | ⋯ | ⋮ | ⋯ | ⋮ | ⋮ |
| ΔL (I) (1, M-1) | ΔL (I) (2, M-1) | ⋯ | ΔL (I) (n, M-1) | ⋯ | ΔL (I) (N-1, M-1) | ΔL (I) (N, M-1) |
| ΔL (I) (1, M) | ΔL (I) (2, M) | ⋯ | ΔL (I) (n, M) | ⋯ | ΔL (I) (N-1, M) | ΔL (I) (N, M) |

| L (I-1) | | | | | |
|---|---|---|---|---|---|
| ΔL (I-1) (1, 1) | ΔL (I-1) (2, 1) | ⋯ | ΔL (I-1) (n, 1) | ⋯ | ΔL (I-1) (N-1, 1) | ΔL (I-1) (N, 1) |
| ΔL (I-1) (1, 2) | ΔL (I-1) (2, 2) | ⋯ | ΔL (I-1) (n, 2) | ⋯ | ΔL (I-1) (N-1, 2) | ΔL (I-1) (N, 2) |
| ⋮ | ⋮ | ⋯ | ⋮ | ⋯ | ⋮ | ⋮ |
| ΔL (I-1) (1, m) | ΔL (I-1) (2, m) | ⋯ | ΔL (I-1) (n, m) | ⋯ | ΔL (I-1) (N-1, m) | ΔL (I-1) (N, m) |
| ⋮ | ⋮ | ⋯ | ⋮ | ⋯ | ⋮ | ⋮ |
| ΔL (I-1) (1, M-1) | ΔL (I-1) (2, M-1) | ⋯ | ΔL (I-1) (n, M-1) | ⋯ | ΔL (I-1) (N-1, M-1) | ΔL (I-1) (N, M-1) |
| ΔL (I-1) (1, M) | ΔL (I-1) (2, M) | ⋯ | ΔL (I-1) (n, M) | ⋯ | ΔL (I-1) (N-1, M) | ΔL (I-1) (N, M) |

| L (i) | | | | | |
|---|---|---|---|---|---|
| ΔL (i) (1, 1) | ΔL (i) (2, 1) | ⋯ | ΔL (i) (n, 1) | ⋯ | ΔL (i) (N-1, 1) | ΔL (i) (N, 1) |
| ΔL (i) (1, 2) | ΔL (i) (2, 2) | ⋯ | ΔL (i) (n, 2) | ⋯ | ΔL (i) (N-1, 2) | ΔL (i) (N, 2) |
| ⋮ | ⋮ | ⋯ | ⋮ | ⋯ | ⋮ | ⋮ |
| ΔL (i) (1, m) | ΔL (i) (2, m) | ⋯ | ΔL (i) (n, m) | ⋯ | ΔL (i) (N-1, m) | ΔL (i) (N, m) |
| ⋮ | ⋮ | ⋯ | ⋮ | ⋯ | ⋮ | ⋮ |
| ΔL (i) (1, M-1) | ΔL (i) (2, M-1) | ⋯ | ΔL (i) (n, M-1) | ⋯ | ΔL (i) (N-1, M-1) | ΔL (i) (N, M-1) |
| ΔL (i) (1, M) | ΔL (i) (2, M) | ⋯ | ΔL (i) (n, M) | ⋯ | ΔL (i) (N-1, M) | ΔL (i) (N, M) |

| L (2) | | | | | |
|---|---|---|---|---|---|
| ΔL (2) (1, 1) | ΔL (2) (2, 1) | ⋯ | ΔL (2) (n, 1) | ⋯ | ΔL (2) (N-1, 1) | ΔL (2) (N, 1) |
| ΔL (2) (1, 2) | ΔL (2) (2, 2) | ⋯ | ΔL (2) (n, 2) | ⋯ | ΔL (2) (N-1, 2) | ΔL (2) (N, 2) |
| ⋮ | ⋮ | ⋯ | ⋮ | ⋯ | ⋮ | ⋮ |
| ΔL (2) (1, m) | ΔL (2) (2, m) | ⋯ | ΔL (2) (n, m) | ⋯ | ΔL (2) (N-1, m) | ΔL (2) (N, m) |
| ⋮ | ⋮ | ⋯ | ⋮ | ⋯ | ⋮ | ⋮ |
| ΔL (2) (1, M-1) | ΔL (2) (2, M-1) | ⋯ | ΔL (2) (n, M-1) | ⋯ | ΔL (2) (N-1, M-1) | ΔL (2) (N, M-1) |
| ΔL (2) (1, M) | ΔL (2) (2, M) | ⋯ | ΔL (2) (n, M) | ⋯ | ΔL (2) (N-1, M) | ΔL (2) (N, M) |

| L (1) | | | | | |
|---|---|---|---|---|---|
| ΔL (1) (1, 1) | ΔL (1) (2, 1) | ⋯ | ΔL (1) (n, 1) | ⋯ | ΔL (1) (N-1, 1) | ΔL (1) (N, 1) |
| ΔL (1) (1, 2) | ΔL (1) (2, 2) | ⋯ | ΔL (1) (n, 2) | ⋯ | ΔL (1) (N-1, 2) | ΔL (1) (N, 2) |
| ⋮ | ⋮ | ⋯ | ⋮ | ⋯ | ⋮ | ⋮ |
| ΔL (1) (1, m) | ΔL (1) (2, m) | ⋯ | ΔL (1) (n, m) | ⋯ | ΔL (1) (N-1, m) | ΔL (1) (N, m) |
| ⋮ | ⋮ | ⋯ | ⋮ | ⋯ | ⋮ | ⋮ |
| ΔL (1) (1, M-1) | ΔL (1) (2, M-1) | ⋯ | ΔL (1) (n, M-1) | ⋯ | ΔL (1) (N-1, M-1) | ΔL (1) (N, M-1) |
| ΔL (1) (1, M) | ΔL (1) (2, M) | ⋯ | ΔL (1) (n, M) | ⋯ | ΔL (1) (N-1, M) | ΔL (1) (N, M) |

FIG.15

| IDENTIFICATION CODE | CORRECTION VALUE DATA |
|---|---|
| 00⋯001 | DATA 1 |
| 00⋯010 | DATA 2 |
| ⋮ | ⋮ |
| ⋯* | DATA q |
| ⋮ | ⋮ |
| 11⋯111 | DATA Q |

DETECTION SYSTEM

CROSS-REFERENCE TO RELATED APPLICATION

This application claims the benefit of priority from Japanese Patent Application No. 2021-133512 filed on Aug. 18, 2021, the entire contents of which are incorporated herein by reference.

BACKGROUND

1. Technical Field

What is disclosed herein relates to a detection system.

2. Description of the Related Art

United States Patent Application Publication No. 2018/0012069 (US-A-2018/0012069) describes an optical sensor in which a plurality of photoelectric conversion elements such as photodiodes are arranged on a semiconductor substrate. In the optical sensor, signals output from the photoelectric conversion elements change depending on an amount of irradiating light, and whereby, biological information can be detected. The optical sensor of US-A-2018/0012069 can detect asperities of a surface of a finger at a fine pitch and is used as a fingerprint sensor. Japanese Patent Application Laid-open Publication No. 2009-032005 (JP-A-2009-032005) describes a display device provided with a plurality of sensors for detecting infrared rays. The display device of JP-A-2009-032005 can detect a position of a finger, a fingerprint pattern, and a vein pattern based on reflected light of the infrared rays.

The photoelectric conversion elements such as the photodiodes have individually different characteristics, resulting in variation in output. The variation in the characteristics of the photoelectric conversion elements provided in the same device causes a reduction in detection accuracy. In addition, the variation in the characteristics of the photoelectric conversion elements among different devices may cause variation in detection results among the devices.

For the foregoing reasons, there is a need for a detection system capable of restraining the variation in detection values of elements in the same device or among different devices.

SUMMARY

According to an aspect, a detection system includes: a sensor provided with a plurality of photosensors in a detection area; a controller configured to control the sensor; and a data storage configured to store correction value data including correction values for detection values of the photosensors and identification codes of a plurality of the sensors in such a manner that the identification codes are associated one-to-one with the correction value data. The controller is configured to acquire the correction value data corresponding to the identification code of the sensor from the data storage and correct the detection values of the photosensors based on the acquired correction value data.

BRIEF DESCRIPTION OF THE DRAWINGS

FIG. 5B is a sectional view illustrating a schematic sectional configuration of the sensor of a detection device according to a first modification;

FIG. 13 is a chart illustrating exemplary correction value data;

FIG. 15 is a chart illustrating the correction value data corresponding to the sensors that is stored in a data storage;

DETAILED DESCRIPTION

Figure 1:
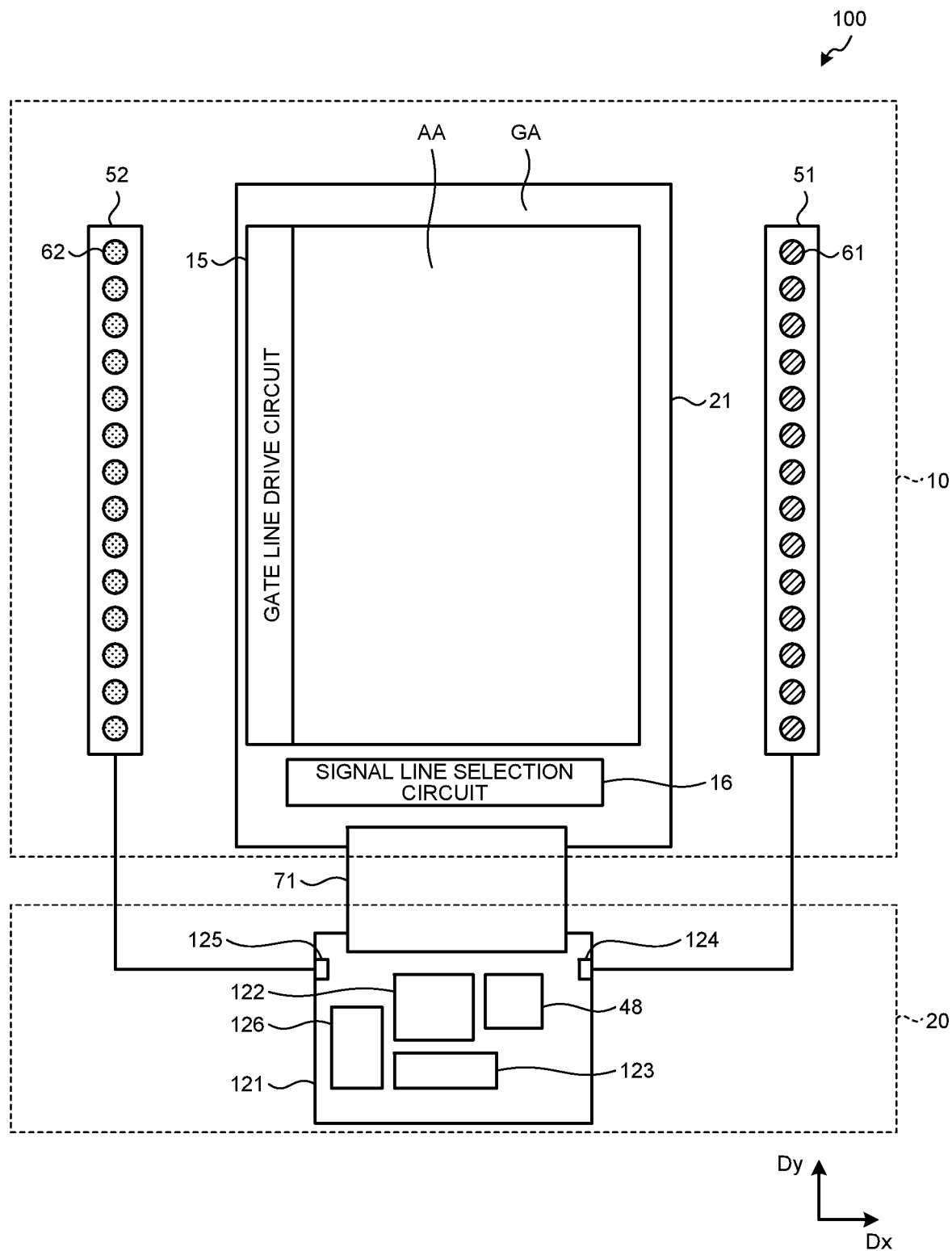
FIG. 1 is a plan view illustrating an example a basic configuration of a detection device applied to a detection system according to an embodiment.

The following describes modes (embodiments) for carrying out the present disclosure in detail with reference to the drawings. The present disclosure is not limited to the description of the embodiments to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

In this disclosure, when an element is described as being "on" another element, the element can be directly on the other element, or there can be one or more elements between the element and the other element.

FIG. 1 is a plan view illustrating an example a basic configuration of a detection device applied to a detection system according to an embodiment. As illustrated in FIG. 1, a detection device 100 includes a sensor 10 and a controller 20.

The sensor 10 includes a sensor substrate 21, a first light source base member 51, and a second light source base member 52. The controller 20 includes a control substrate 121, a detection circuit 48, a control circuit 122, a power supply circuit 123, and an interface circuit 126.

The sensor substrate 21 has a detection area AA and a peripheral area GA. The detection area AA is an area provided with a plurality of photosensors PD (refer to FIG. 4). The peripheral area GA is an area between the outer perimeter of the detection area AA and the ends of the sensor substrate 21, and is an area provided with a gate line drive circuit 15 and a signal line selection circuit 16.

FIG. 1 illustrates an example in which the first light source base member 51 is provided with a plurality of first light sources 61 and the second light source base member 52 is provided with a plurality of second light sources 62. However, the arrangement of the first and the second light sources 61 and 62 illustrated in FIG. 1 is merely an example and can be changed as appropriate. For example, the first and the second light sources 61 and 62 may be arranged on each of the first and the second light source base members 51 and 52. In this case, a group including the first light sources 61 and a group including the second light sources 62 may be arranged side by side in a second direction Dy, or the first and the second light sources 61 and 62 may be alternately arranged in the second direction Dy. The first and the second light sources 61 and 62 may be provided on one light source base member, or three or more light source base members. Furthermore, the first and the second light sources 61 and 62 may be light sources of the same type. Alternatively, the first and the second light sources 61 and 62 may be, for example, what are called direct-type light sources provided directly below the detection area AA.

The sensor substrate 21 is electrically coupled to the control substrate 121 through a flexible printed circuit board 71 (hereinafter, also called an "FPC 71"). The control substrate 121 is provided with the detection circuit 48, the control circuit 122, the power supply circuit 123, and the interface circuit 126.

The control circuit 122 includes, for example, a control integrated circuit (IC) that outputs logic control signals. In an aspect of the present disclosure, the control circuit 122 may include, for example, a programmable logic device (PLD) such as a field-programmable gate array (FPGA).

The control circuit 122 supplies control signals to the sensor 10, the gate line drive circuit 15, and the signal line selection circuit 16 to control a detection operation of the sensor 10. The control circuit 122 also supplies control signals to the first and the second light sources 61 and 62 to control lighting and non-lighting of the first and the second light sources 61 and 62.

The power supply circuit 123 supplies voltage signals including, for example, a sensor power supply potential VDDSNS (refer to FIG. 4) to the sensor 10, the gate line drive circuit 15, and the signal line selection circuit 16. The power supply circuit 123 supplies a power supply voltage to the first and the second light sources 61 and 62.

The interface circuit 126 is, for example, a Universal Serial Bus (USB) controller IC, and controls communication between the control circuit 122 and an external host control device (to be described later).

The gate line drive circuit 15 and the signal line selection circuit 16 are provided in the peripheral area GA of the sensor substrate 21. Specifically, the gate line drive circuit 15 is provided in an area extending along the second direction Dy in the peripheral area GA. The signal line selection circuit 16 is provided in an area extending along a first direction Dx in the peripheral area GA.

The first direction Dx is one direction in a plane parallel to the sensor substrate 21. The second direction Dy is one direction in the plane parallel to the sensor substrate 21 and is a direction orthogonal to the first direction Dx. The second direction Dy may non-orthogonally intersect the first direction Dx. A third direction Dz is a direction orthogonal to the first direction Dx and the second direction Dy and is a direction normal to the sensor substrate 21.

The first light sources 61 are provided on the first light source base member 51 and are arranged along the second direction Dy. The second light sources 62 are provided on the second light source base member 52 and are arranged along the second direction Dy. The first light source base member 51 and the second light source base member 52 are electrically coupled, through respective terminals 124 and 125 provided on the control substrate 121, to the control circuit 122 and the power supply circuit 123.

For example, inorganic light-emitting diodes (LEDs) or organic electroluminescent (EL) diodes (organic light-emitting diodes: OLEDs) are used as the first and the second light sources 61 and 62. The first and the second light sources 61 and 62 emit first light and second light, respectively, having different wavelengths. Alternatively, in an aspect of the present disclosure, the first and the second light sources 61 and 62 may emit light having the same wavelength.

The first light emitted from the first light sources 61 is, for example, mainly reflected on a surface of an object to be detected, such as a finger Fg, and enters the photosensors PD in the detection area AA. As a result, the sensor 10 can detect a fingerprint by detecting a shape of asperities on the surface of the finger Fg or the like. For example, the second light emitted from the second light sources 62 is reflected in the object to be detected, such as the finger Fg or a wrist, or transmitted through the finger Fg, the wrist, and the like, and enters the photosensors PD in the detection area AA. As a result, the sensor 10 can detect information on a living body in the finger Fg, the wrist, and the like. Examples of the information on the living body include a pulse wave, pulsation, and a vascular image of the finger Fg, the wrist, or a palm. That is, the detection device 100 is configured as a detection device that detects the information on the living body including the fingerprint, the pulse wave, the pulsation, and a vascular pattern of, for example, veins.

The first light may have a wavelength of from 520 nm to 600 nm, for example, a wavelength of approximately 550 nm, and the second light may have a wavelength of from 780 nm and 950 nm, for example, a wavelength of approximately 850 nm. In this case, the first light is visible light in blue or green (blue light or green light), and the second light is infrared light. The sensor 10 can detect the fingerprint based on the first light emitted from the first light sources 61. The second light emitted from the second light sources 62 is reflected in the object to be detected such as the finger Fg, or transmitted through or absorbed by the finger Fg or the like, and enters the photosensors PD in the detection area AA. As a result, the sensor 10 can detect the pulse wave or the vascular image (vascular pattern) of the veins or the like as the information on the living body in the finger Fg or the like.

Alternatively, the first light may have a wavelength of from 600 nm to 700 nm, for example, approximately 660 nm, and the second light may have a wavelength of from 780 nm and 950 nm, for example, approximately 850 nm. In this case, the first light is visible light in red (red light), and the second light is infrared light. Based on the first light emitted from the first light sources 61 and the second light emitted from the second light sources 62, the sensor 10 can detect a blood oxygen level, in addition to the pulse wave, the pulsation, and the vascular image, as the information on the living body. As described above, the detection device 100 includes the first and the second light sources 61 and 62, and performs the detection based on the first light and the detection based on the second light, and thereby can detect the various types of information on the living body.

Figure 2:
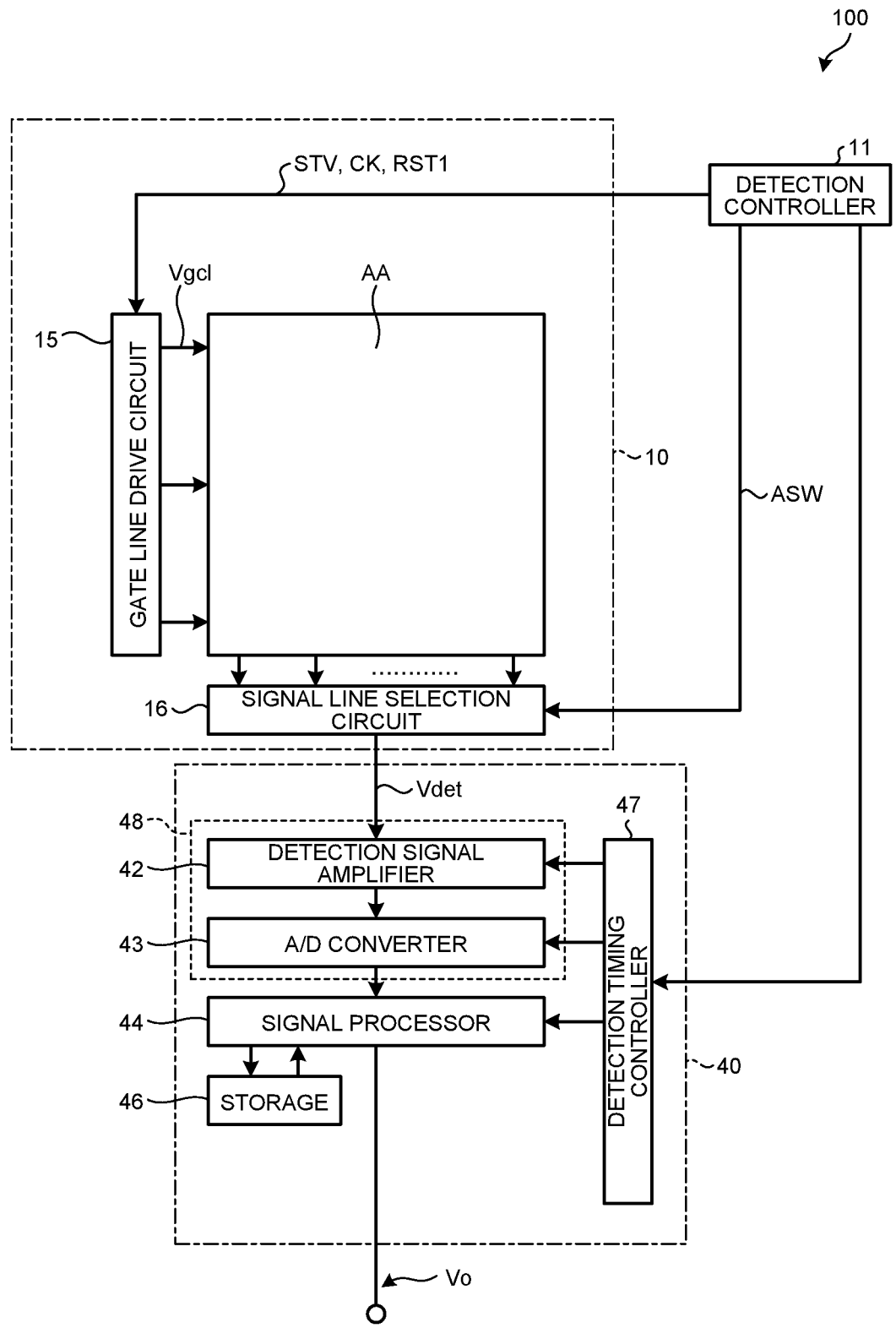
FIG. 2 is a block diagram illustrating a circuit configuration of the detection device.

FIG. 2 is a block diagram illustrating a circuit configuration of the detection device. As illustrated in FIG. 2, the detection device 100 includes a detection controller (detection control circuit) 11 and a detector (detection processing circuit) 40.

The sensor 10 is provided with the photosensors PD in the detection area AA. Each of the photosensors PD is a photodiode and outputs an electrical signal corresponding to light received by the photosensor PD as a detection signal Vdet to the signal line selection circuit 16. The sensor 10 performs the detection in response to a gate drive signal Vgcl supplied from the gate line drive circuit 15.

The detection controller 11 is a circuit that supplies respective control signals to the gate line drive circuit 15, the signal line selection circuit 16, and the detector 40 to control operations thereof. The detection controller 11 supplies various control signals such as a start signal STV, a clock signal CK, and a reset signal RST1 to the gate line drive circuit 15. The detection controller 11 also supplies various control signals such as a selection signal ASW to the signal line selection circuit 16. The detection controller 11 supplies various control signals to the first and the second light sources 61 and 62 to control the lighting and the non-lighting of each group of the first and the second light sources 61 and 62. In the present disclosure, the detection controller 11 is included, for example, in the control circuit 122.

The gate line drive circuit 15 is a circuit that drives a plurality of gate lines GCL (refer to FIG. 3) based on the various control signals. The gate line drive circuit 15 sequentially or simultaneously selects the gate lines GCL, and supplies the gate drive signals Vgcl to the selected gate lines GCL. By this operation, the gate line drive circuit 15 selects the photosensors PD coupled to the gate lines GCL.

Figure 3:
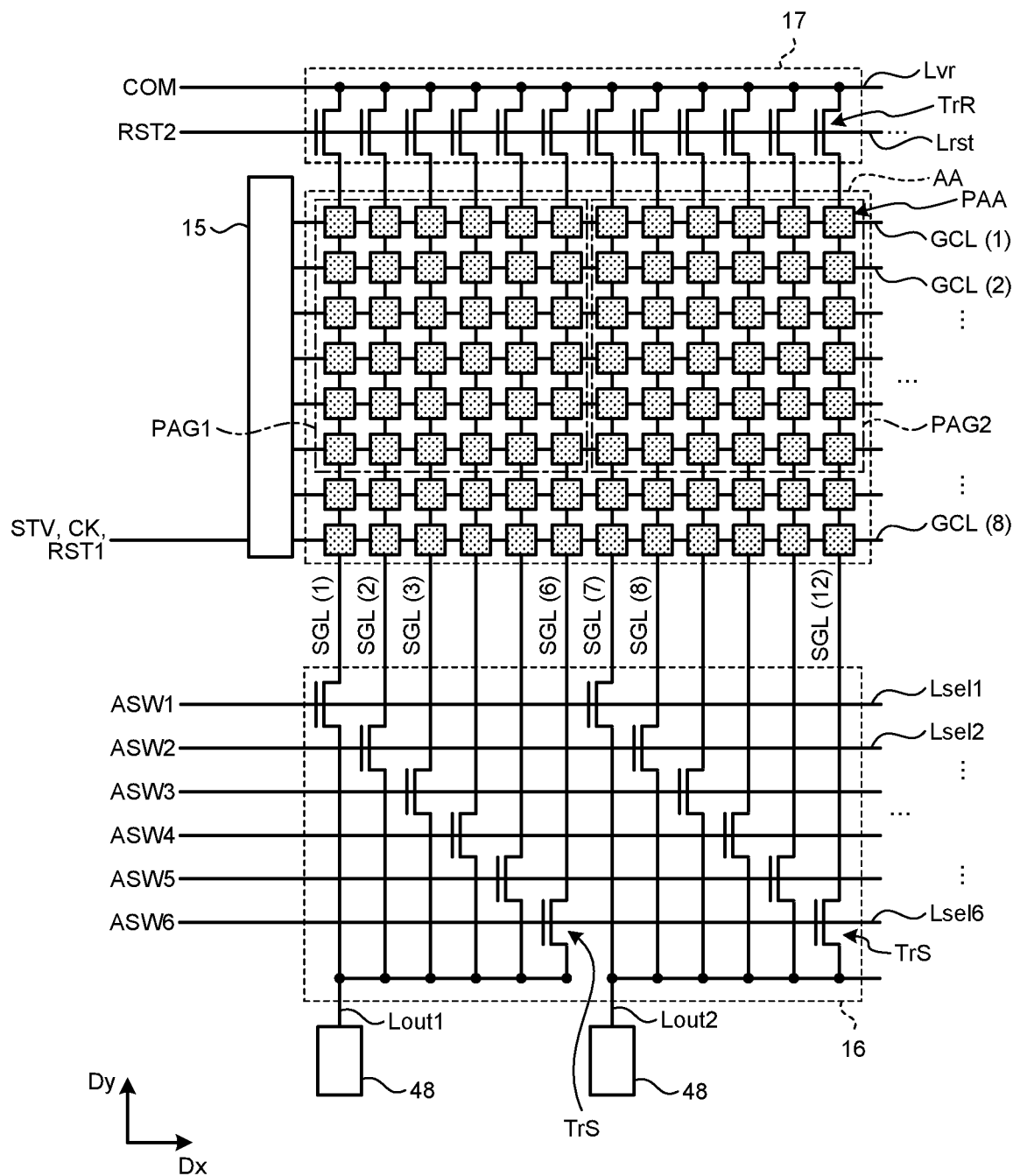
FIG. 3 is a circuit diagram illustrating the detection device.

The signal line selection circuit 16 is a switch circuit that sequentially or simultaneously selects a plurality of signal lines SGL (refer to FIG. 3). The signal line selection circuit 16 is, for example, a multiplexer. The signal line selection circuit 16 electrically couples the selected signal lines SGL to the detection circuit 48 based on the selection signal ASW supplied from the detection controller 11. By this operation, the signal line selection circuit 16 outputs the detection signals Vdet of the photosensors PD to the detector 40.

The detector 40 includes the detection circuit 48, a signal processor (signal processing circuit) 44, a storage (storage circuit) 46, and a detection timing controller (detection timing control circuit) 47. Based on a control signal supplied from the detection controller 11, the detection timing controller 47 controls the detection circuit 48 and the signal processor 44 so as to operate in synchronization with each other.

The detection circuit 48 is, for example, an analog front-end (AFE) circuit. The detection circuit 48 is a signal processing circuit having functions of at least a detection signal amplifier 42 and an analog-to-digital (A/D) converter 43. The detection signal amplifier 42 amplifies the detection signals Vdet. The A/D converter 43 converts analog signals output from the detection signal amplifier 42 into digital signals.

The signal processor 44 is a logic circuit that processes the signals detected by the sensor 10 based on signals output from the detection circuit 48. The signal processor 44 is included, for example, in the control circuit 122.

The storage 46 temporarily stores therein the signals processed by the signal processor 44. In the present disclosure, the storage 46 stores, for example, correction value data obtained from a data storage provided in a network server to be described later. The storage 46 may be, for example, a random-access memory (RAM) or a register circuit. The storage 46 is included, for example, in the control circuit 122.

The following describes a circuit configuration example of the detection device 100. FIG. 3 is a circuit diagram illustrating the detection device. As illustrated in FIG. 3, the sensor 10 has a plurality of partial detection areas PAA arranged in a matrix having a row-column configuration. Each of the partial detection areas PAA is provided with the photosensor PD.

The gate lines GCL extend in the first direction Dx and are each coupled to the partial detection areas PAA arranged in the first direction Dx. A plurality of gate lines GCL(1), GCL(2), . . . , GCL(8) are arranged in the second direction Dy and are each coupled to the gate line drive circuit 15. In the following description, the gate lines GCL(1), GCL(2), . . . , GCL(8) will each be simply referred to as the gate line GCL when they need not be distinguished from one another. For ease of understanding of the description, FIG. 3 illustrates eight gate lines GCL. However, this is merely an example, and M gate lines GCL (where M is eight or larger, and is, for example, 256) may be arranged.

The signal lines SGL extend in the second direction Dy and are each coupled to the photosensors PD of the partial detection areas PAA arranged in the second direction Dy. A plurality of signal lines SGL(1), SGL(2), . . . , SGL(12) are arranged in the first direction Dx, and are each coupled to the signal line selection circuit 16 and a reset circuit 17. In the following description, the signal lines SGL(1), SGL(2), . . . , SGL(12) will each be simply referred to as the signal line SGL when they need not be distinguished from one another.

For ease of understanding of the description, 12 signal lines SGL are illustrated. However, this is merely an example, and N signal lines SGL (where N is 12 or larger, and is, for example, 252) may be arranged.

The gate line drive circuit 15 receives the various control signals such as the start signal STV, the clock signal CK, and the reset signal RST1 from the control circuit 122 (refer to FIG. 1). The gate line drive circuit 15 sequentially selects the gate lines GCL(1), GCL(2), . . . , GCL(8) in a time-division manner based on the various control signals. The gate line drive circuit 15 supplies the gate drive signal Vgcl to the selected one of the gate lines GCL. This operation supplies the gate drive signal Vgcl to a plurality of switching elements Tr coupled to the gate line GCL, and corresponding ones of the partial detection areas PAA arranged in the first direction Dx are selected as detection targets.

The gate line drive circuit 15 may perform different driving for each of detection modes including the detection of a fingerprint and the detection of a plurality of different items of information on the living body (including, for example, the pulse wave, the pulsation, the vascular image of the veins and the like, and the blood oxygen level, which are hereinafter called also simply "biological information"). For example, the gate line drive circuit 15 may drive more than one of the gate lines GCL collectively.

Specifically, the gate line drive circuit 15 simultaneously selects a predetermined number of the gate lines GCL from among the gate lines GCL(1), GCL(2), . . . , GCL(8) based on the control signals. For example, the gate line drive circuit 15 simultaneously selects six gate lines GCL(1) to GCL(6) and supplies thereto the gate drive signals Vgcl. The gate line drive circuit 15 supplies the gate drive signals Vgcl through the selected six gate lines GCL to the switching elements Tr. By this operation, block units PAG1 and PAG2 each including more than one of the partial detection areas PAA arranged in the first direction Dx and the second direction Dy are selected as the respective detection targets. The gate line drive circuit 15 collectively drives the predetermined number of the gate lines GCL and sequentially supplies the gate drive signals Vgcl to each unit of the predetermined number of the gate lines GCL.

The signal line selection circuit 16 includes a plurality of selection signal lines Lsel, a plurality of output signal lines Lout, and third switching elements TrS. The third switching elements TrS are provided corresponding to the signal lines SGL. Six signal lines SGL(1), SGL(2), . . . , SGL(6) are coupled to a common output signal line Lout1. Six signal lines SGL(7), SGL(8), . . . , SGL(12) are coupled to a common output signal line Lout2. The output signal lines Lout1 and Lout2 are each coupled to the detection circuit 48.

The signal lines SGL(1), SGL(2), . . . , SGL(6) are grouped into a first signal line block, and the signal lines SGL(7), SGL(8), . . . , SGL(12) are grouped into a second signal line block. The selection signal lines Lsel are coupled to the gates of the respective third switching elements TrS included in one of the signal line blocks. One of the selection signal lines Lsel is coupled to the gates of the third switching elements TrS in the signal line blocks.

Specifically, selection signal lines Lsel1, Lsel2, . . . , Lsel6 are coupled to the third switching elements TrS corresponding to the signal lines SGL(1), SGL(2), . . . , SGL(6), respectively. The selection signal line Lsel1 is coupled to one of the third switching elements TrS corresponding to the signal line SGL(1) and one of the third switching elements TrS corresponding to the signal line SGL(7). The selection signal line Lsel2 is coupled to one of the third switching elements TrS corresponding to the signal line SGL(2) and one of the third switching elements TrS corresponding to the signal line SGL(8).

The control circuit 122 (refer to FIG. 1) sequentially supplies the selection signal ASW to the selection signal lines Lsel. This operation causes the signal line selection circuit 16 to operate the third switching elements TrS to sequentially select the signal lines SGL in one of the signal line blocks in a time-division manner. The signal line selection circuit 16 selects one of the signal lines SGL in each of the signal line blocks. With the above-described configuration, the detection device 100 can reduce the number of integrated circuits (ICs) including the detection circuit 48 or the number of terminals of the ICs.

The signal line selection circuit 16 may couple more than one of the signal lines SGL collectively to the detection circuit 48. Specifically, the control circuit 122 (refer to FIG. 1) simultaneously supplies the selection signal ASW to the selection signal lines Lsel. The signal line selection circuit 16 operates the third switching elements TrS to select the signal lines SGL (for example, six of the signal lines SGL) in one of the signal line blocks, and couples the signal lines SGL to the detection circuit 48. As a result, the signals detected in each of the block units PAG1 and PAG2 are output to the detection circuit 48. In this case, the signals from the partial detection areas PAA (photosensors PD) included in each of the block units PAG1 and PAG2 are put together and output to the detection circuit 48.

By the operations of the gate line drive circuit 15 and the signal line selection circuit 16, the detection is performed for each of the block units PAG1 and PAG2. As a result, the intensity of the detection signal Vdet obtained by a single detection operation increases, so that the sensor sensitivity can be improved.

As illustrated in FIG. 3, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 4) included in each of the partial detection areas PAA.

Figure 4:
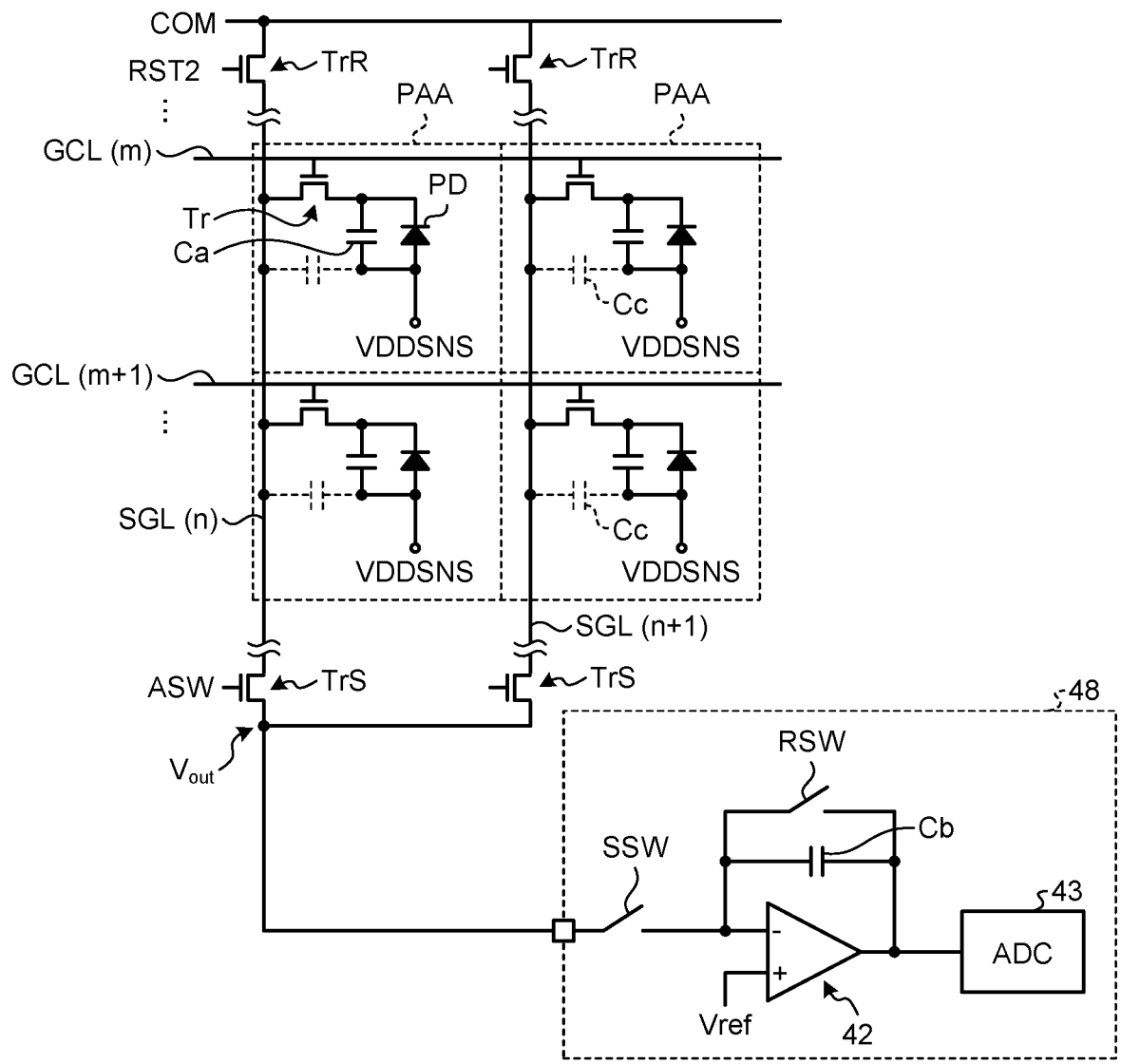
FIG. 4 is a circuit diagram illustrating a plurality of partial detection areas.

FIG. 4 is a circuit diagram illustrating the partial detection areas of the detection device according to the embodiment. FIG. 4 also illustrates a circuit configuration of the detection circuit 48. As illustrated in FIG. 4, each of the partial detection areas PAA includes the photosensor PD, the capacitive element Ca, and a corresponding one of the switching elements Tr. The capacitive element Ca is capacitance (sensor capacitance) generated in the photosensor PD and is equivalently coupled in parallel to the photosensor PD. In addition, signal line capacitance Cc is parasitic capacitance generated in the signal line SGL and is equivalently generated between the signal line SGL and a node between the anode of the photosensor PD and one end side of the capacitive element Ca.

FIG. 4 illustrates two gate lines GCL(m) and GCL(m+1) arranged in the second direction Dy among the gate lines GCL. FIG. 4 also illustrates two signal lines SGL(n) and SGL(n+1) arranged in the first direction Dx among the signal lines SGL. The partial detection area PAA is an area surrounded by the gate lines GCL and the signal lines SGL.

Each of the switching elements Tr is provided correspondingly to the photosensor PD. The switching element Tr includes a thin-film transistor, and in this example, includes an n-channel metal oxide semiconductor (MOS) thin-film transistor (TFT).

The gates of the switching elements Tr belonging to the partial detection areas PAA arranged in the first direction Dx are coupled to the gate line GCL. The sources of the switching elements Tr belonging to the partial detection areas PAA arranged in the second direction Dy are coupled to the signal line SGL. The drain of the switching element Tr is coupled to the cathode of the photosensor PD and the capacitive element Ca.

The anode of the photosensor PD is supplied with the sensor power supply potential VDDSNS from the power supply circuit 123. The signal line SGL and the capacitive element Ca are supplied with the reference signal COM that serves as an initial potential of the signal line SGL and the capacitive element Ca from the power supply circuit 123.

During a reset period Prst (refer to FIG. 6) to be described later, the reset signal RST2 is supplied to the reset signal line Lrst, and the reference signal COM is supplied to the signal line SGL. The gate line drive circuit 15 sequentially supplies the gate drive signals Vgcl to the gate lines GCL to charge the capacitive elements Ca with a reset potential (potential of the reference signal COM at, for example, 0.75 V). The control circuit 122 (refer to FIG. 1) sequentially supplies the selection signals ASW to the selection signal lines Lsel to charge the signal lines SGL with the reset potential (potential of the reference signal COM at, for example, 0.75 V in the same manner as the capacitive elements Ca.

When the partial detection area PAA is irradiated with light during an exposure period Pex (refer to FIG. 6), a current corresponding to the amount of the light flows through the photosensor PD, which reduces the electric charge of the capacitive element Ca to reduce the potential of the capacitive element Ca from the reset potential (for example, 0.75 V). Then, when the switching element Tr and the third switching element TrS of the signal line selection circuit 16 are turned on in a reading period Pdet (refer to FIG. 6), each of the capacitive elements Ca is coupled to the detection circuit 48. Thus, the detection device 100 can detect a signal corresponding to the amount of the light irradiating the photosensor PD in each of the partial detection areas PAA or a signal corresponding to the amount of the light irradiating the photosensors PD in each of the block units PAG1 and PAG2.

During the reading period Pdet (refer to FIG. 6), a switch SSW of the detection circuit 48 is turned on, and the detection circuit 48 is coupled to the signal lines SGL. The detection signal amplifier 42 of the detection circuit 48 converts a variation in the electric charge of the capacitive element Ca into a variation of voltage, and amplifies the result. A reference potential (Vref) having a fixed potential is supplied to a non-inverting input portion (+) of the detection signal amplifier 42, and the signal lines SGL are coupled to an inverting input terminal (−) of the detection signal amplifier 42. In the present embodiment, the same signal as the reference signal COM is supplied as the reference potential (Vref). The detection signal amplifier 42 includes a capacitive element Cb and a reset switch RSW. During the reset period Prst (refer to FIG. 6), the reset switch RSW is turned on, and an electric charge of the capacitive element Cb is reset.

Figure 5A:
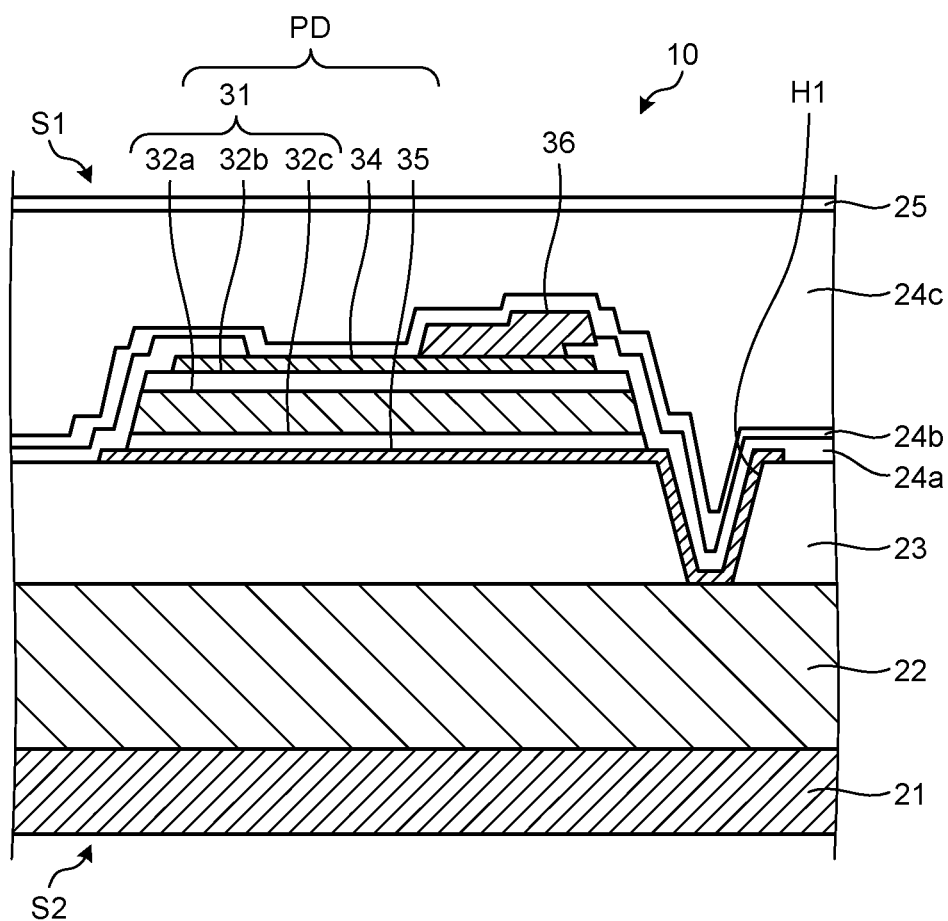
FIG. 5A is a sectional view illustrating a schematic sectional configuration of a sensor.

The following describes a configuration of the photosensor PD. FIG. 5A is a sectional view illustrating a schematic sectional configuration of the sensor. As illustrated in FIG. 5A, the sensor 10 includes the sensor substrate 21, a TFT layer 22, an insulating layer 23, the photosensor PD, and insulating layers 24a, 24b, 24c, and 25.

The sensor substrate 21 is an insulating base member and is made using, for example, glass or a resin material. The sensor substrate 21 is not limited to having a flat plate shape and may have a curved surface. In this case, the sensor substrate 21 may be made of a film-like resin.

The sensor substrate 21 has a first surface and a second surface on the opposite side of the first surface. The TFT layer 22, the insulating layer 23, the photosensor PD, and the insulating layers 24 and 25 are stacked in this order on the first surface.

The TFT layer 22 is provided with circuits such as the gate line drive circuit 15 and the signal line selection circuit 16 described above. The TFT layer 22 is also provided with TFTs such as the switching elements Tr and various types of wiring such as the gate lines GCL and the signal lines SGL. The sensor substrate 21 and the TFT layer 22 are a drive circuit board that drives the sensing region for each predetermined detection area and are also called a backplane or an array substrate.

The insulating layer 23 is an organic insulating layer and is provided on the TFT layer 22. The insulating layer 23 is a planarizing layer that planarizes asperities formed by the switching element Tr formed in the TFT layer 22 and various conductive layers.

The photosensor PD is provided on the insulating layer 23. The photosensor PD includes a lower electrode 35, a semiconductor layer 31, and an upper electrode 34, which are stacked in this order.

The lower electrode 35 is provided on the insulating layer 23, and is electrically coupled to the switching element Tr in the TFT layer 22 through a contact hole H1. The lower electrode 35 is the cathode of the photosensor PD and is an electrode for reading the detection signal Vdet. A plurality of the lower electrodes 35 are provided for each of the photosensors PD.

The semiconductor layer 31 is formed of amorphous silicon (a-Si). The semiconductor layer 31 includes an i-type semiconductor layer 32a, a p-type semiconductor layer 32b, and an n-type semiconductor layer 32c. The i-type semiconductor layer 32a, the p-type semiconductor layer 32b, and the n-type semiconductor layer 32c are specific examples of photoelectric conversion elements. In FIG. 5A, the n-type semiconductor layer 32c, the i-type semiconductor layer 32a, and the p-type semiconductor layer 32b are stacked in this order in a direction orthogonal to a surface of the sensor substrate 21. However, the semiconductor layer 31 may have a reversed configuration, that is, the p-type semiconductor layer 32b, the i-type semiconductor layer 32a, and the n-type semiconductor layer 32c may be stacked in this order. The semiconductor layer 31 may be a photoelectric conversion element formed of organic semiconductors.

The a-Si of the n-type semiconductor layer 32c is doped with impurities to form an n+ region. The a-Si of the p-type semiconductor layer 32b is doped with impurities to form a p+ region. The i-type semiconductor layer 32a is, for example, a non-doped intrinsic semiconductor, and has lower conductivity than that of the p-type semiconductor layer 32b and the n-type semiconductor layer 32c.

The anode electrode 34 is the anode of the photosensor PD and is an electrode for supplying the sensor power supply potential VDDSNS to a photoelectric conversion layer. The anode electrode 34 is provided in common to the photosensors PD.

For example, a light-transmitting conductive material such as indium zinc oxide (IZO) is used as the upper electrode 34. For example, a light-transmitting conductive material such as indium tin oxide (ITO) is used as the lower electrode 35.

The lower electrode 35 and the upper electrode 34 may be made of a metal material such as silver (Ag) or an alloy material containing at least one or more of a plurality of metal materials. In this case, the electrodes can be formed as light-transmitting transflective electrodes by controlling the film thickness of the electrodes. For example, the electrodes are formed of a thin Ag film having a thickness of 10 nm to have light transmittance of approximately 60%. This configuration allows the photosensor PD to detect both light emitted from a first surface S1 side and light emitted from a second surface S2 side of the sensor substrate 21.

The insulating layers 24a and 24b are provided on the insulating layer 23. The insulating layer 24a covers the periphery of the upper electrode 34, and is provided with an opening in a position overlapping the upper electrode 34. Coupling wiring 36 is coupled to the upper electrode 34 at a portion of the upper electrode 34 not provided with the insulating layer 24a. The insulating layer 24b is provided on the insulating layer 24a so as to cover the upper electrode 34 and the coupling wiring 36. The insulating layer 24c serving as a planarizing layer is provided on the insulating layer 24b. The insulating layer 25 is provided on the insulating layer 24c. However, the insulating layer 25 need not be provided.

FIG. 5B is a sectional view illustrating a schematic sectional configuration of the sensor of a detection device according to a first modification. As illustrated in FIG. 5B, in a detection device 100A of the first modification, a photosensor PDA is provided above an insulating layer 23a. The insulating layer 23a is an inorganic insulating layer provided so as to cover the insulating layer 23, and is formed of silicon nitride (SiN), for example. The photosensor PDA includes a photoelectric conversion layer 31A, the lower electrode 35 (cathode), and the upper electrode 34 (anode). The lower electrode 35, the photoelectric conversion layer 31A, and the upper electrode 34 are stacked in this order in a direction orthogonal to the first surface S1 of the sensor substrate 21.

The photoelectric conversion layer 31A changes in characteristics (for example, voltage-current characteristics and a resistance value) depending on light emitted thereto. An organic material is used as a material of the photoelectric conversion layer 31A. Specifically, as the photoelectric conversion layer 31A, low-molecular-weight organic materials can be used including, for example, fullerene ($C_{60}$), phenyl-$C_{61}$-butyric acid methyl ester (PCBM), copper phthalocyanine (CuPc), fluorinated copper phthalocyanine ($F_{16}$CuPc), rubrene (5,6,11,12-tetraphenyltetracene), and perylene diimide (PDI) (a derivative of perylene).

The photoelectric conversion layer 31A can be formed by a vapor deposition process (dry process) using the above-listed low-molecular-weight organic materials. In this case, the photoelectric conversion layer 31A may be, for example, a multilayered film of CuPc and $F_{16}$CuPc, or a multilayered film of rubrene and $C_{60}$. The photoelectric conversion layer 31A can also be formed by a coating process (wet process). In this case, the photoelectric conversion layer 31A is made using a material obtained by combining the above-listed low-molecular-weight organic materials with high-molecular-weight organic materials. For example, poly(3-hexylthiophene) (P3HT) and F8-alt-benzothiadiazole (F8BT) can be used as the high-molecular-weight organic materials. The photoelectric conversion layer 31A can be a film in the state of a mixture of P3HT and PCBM or a film in the state of a mixture of F8BT and PDI.

The lower electrode 35 faces the upper electrode 34 with the photoelectric conversion layer 31A interposed therebetween. For example, a light-transmitting conductive material such as IZO is used as the upper electrode 34. For example, a light-transmitting conductive material such as ITO is used as the lower electrode 35.

The lower electrode 35 and the upper electrode 34 may be made of a metal material such as silver (Ag) or an alloy material containing at least one or more of a plurality of metal materials. In this case, the electrodes can be formed as light-transmitting transflective electrodes by controlling the film thickness of the electrodes. For example, the electrodes are formed of a thin Ag film having a thickness of 10 nm to have light transmittance of approximately 60%. This configuration allows the photosensor PDA to detect both light emitted from the first surface S1 side and light emitted from the second surface S2 side of the sensor substrate 21.

Although not illustrated in FIG. 5B, the insulating layer 24 may be provided so as to cover the upper electrode 34. The insulating layer is a passivation film and is provided to protect the photosensor PDA.

As illustrated in FIG. 5B, the TFT layer 22 is provided with the switching element Tr electrically coupled to the photosensor PDA. The switching element Tr includes a semiconductor layer 81, a source electrode 82, a drain electrode 83, and gate electrodes 84 and 85. The lower electrode 35 of the photosensor PDA is electrically coupled to the drain electrode 83 of the switching element Tr through a contact hole H11 provided in the insulating layers 23 and 23a.

The switching element Tr has what is called a dual-gate structure having the gate electrodes 84 and 85 on the upper and lower sides of the semiconductor layer 81. However, the switching element Tr is not limited to this structure and may have a top-gate structure or a bottom-gate structure.

FIG. 5B schematically illustrates a second switching element TrA and a terminal provided in the peripheral area GA. The second switching element TrA is, for example, a switching element provided in the gate line drive circuit 15 (refer to FIG. 1). The second switching element TrA includes a semiconductor layer 86, a source electrode 87, a drain electrode 88, and a gate electrode 89. The second switching element TrA has what is called a top-gate structure in which the gate electrode 89 is provided on the upper side of the semiconductor layer 86. A light-blocking layer 90 is provided between the semiconductor layer 86 and the sensor substrate 21 on the lower side of the semiconductor layer 86. The second switching element TrA is, however, not limited to the above-described structure, and may have a bottom-gate structure or a dual-gate structure.

The semiconductor layer 81 of the switching element Tr is provided in a layer different from that of the semiconductor layer 86 of the second switching element TrA. The semiconductor layer 81 of the switching element Tr is formed of, for example, an oxide semiconductor. The semiconductor layer 86 of the second switching element TrA is formed of, for example, polysilicon.

Figure 6:
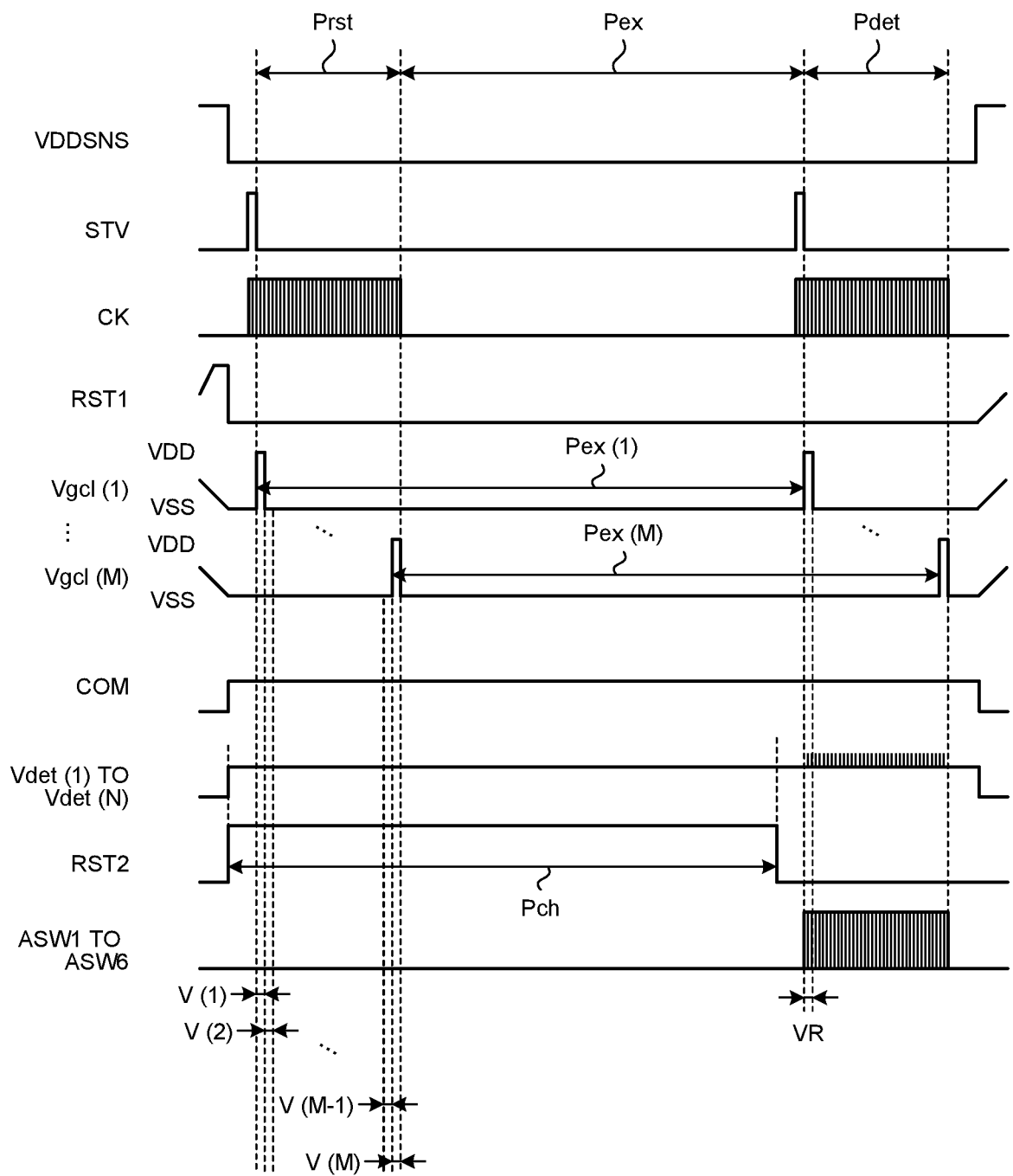
FIG. 6 is a timing waveform diagram illustrating an operation example of the detection device.
Figure 7:
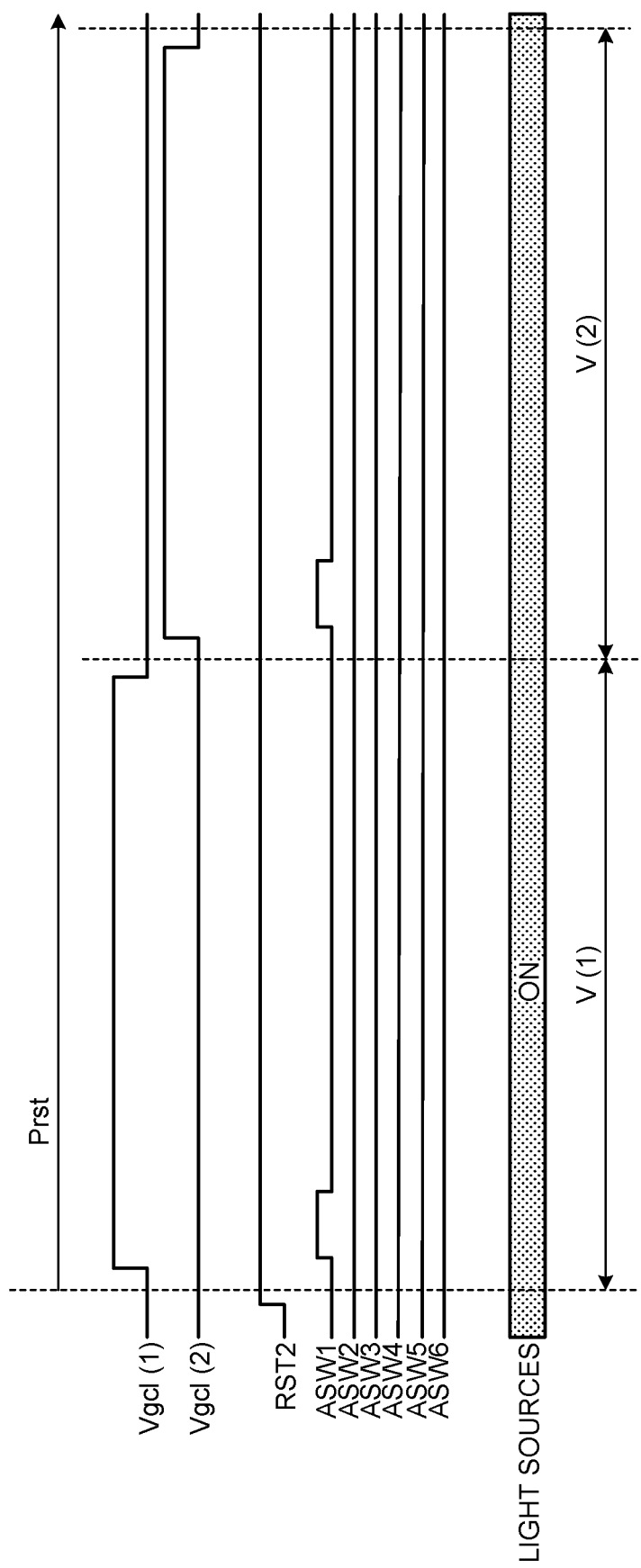
FIG. 7 is a timing waveform diagram illustrating an operation example during a reset period in FIG. 6.
Figure 8:
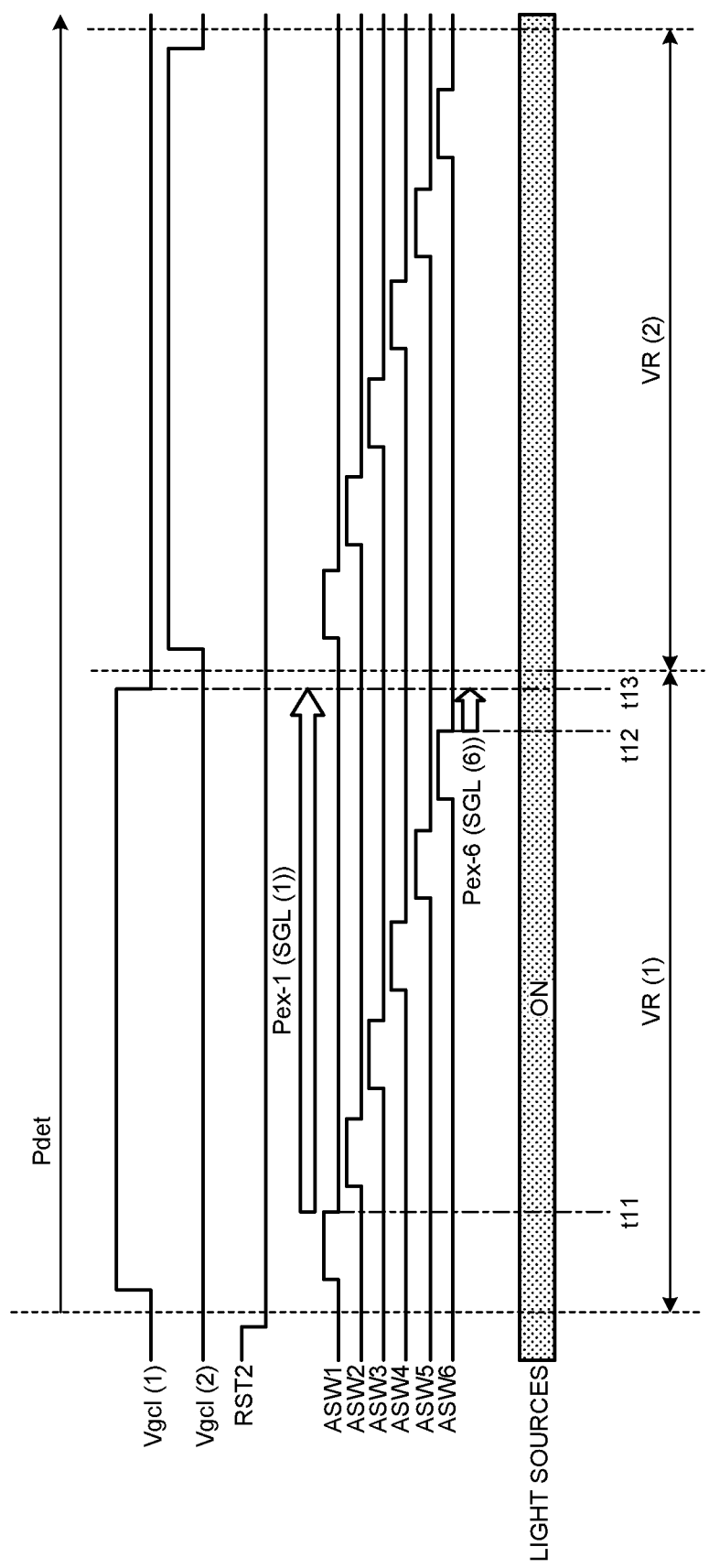
FIG. 8 is a timing waveform diagram illustrating an operation example during a reading period in FIG. 6.
Figure 9:
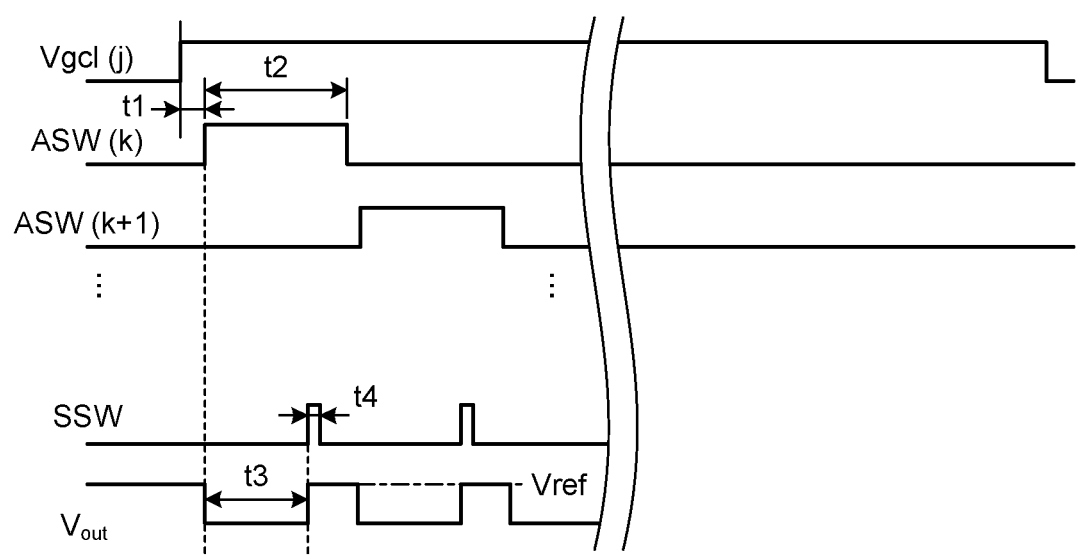
FIG. 9 is a timing waveform diagram illustrating an operation example during a drive period of one gate line included in the reading period in FIG. 6.
Figure 10:
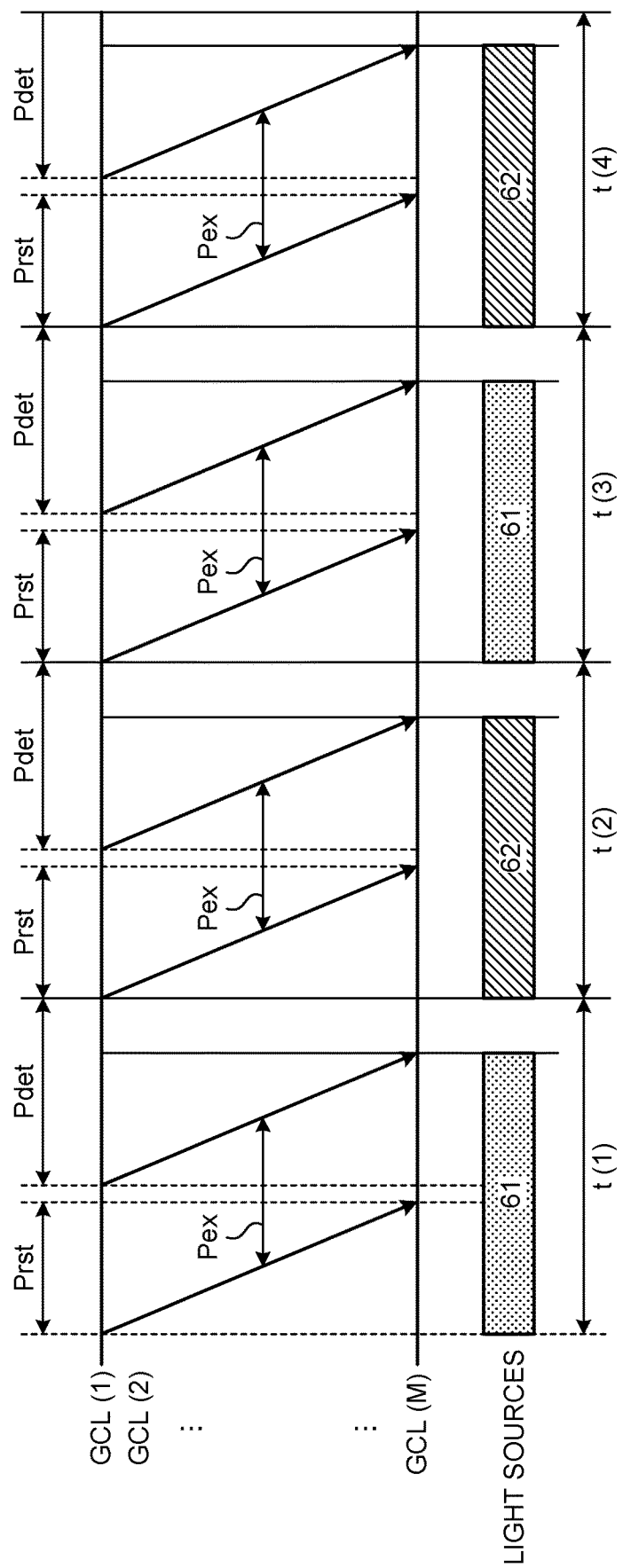
FIG. 10 is an explanatory diagram for explaining a relation between driving of the sensor of the detection device and lighting operations of light sources.

The following describes an operation example of the detection device 100. FIG. 6 is a timing waveform diagram illustrating the operation example of the detection device. FIG. 7 is a timing waveform diagram illustrating an operation example during the reset period in FIG. 6. FIG. 8 is a timing waveform diagram illustrating an operation example during the reading period in FIG. 6. FIG. 9 is a timing waveform diagram illustrating an operation example during a drive period of one gate line included in a row reading period VR in FIG. 6. FIG. 10 is an explanatory diagram for explaining a relation between the driving of the sensor of the detection device and the lighting operations of light sources.

As illustrated in FIG. 6, the detection device 100 has the reset period Prst, the exposure period Pex, and the reading period Pdet. The power supply circuit 123 supplies the sensor power supply potential VDDSNS to the anode of the photosensor PD over the reset period Prst, the exposure period Pex, and the reading period Pdet. The sensor power supply potential VDDSNS is a signal that applies a reverse bias between the anode and the cathode of the photosensor PD. For example, the reference signal COM of substantially 0.75 V is applied to the cathode of the photosensor PD, and the sensor power supply potential VDDSNS of substantially −1.25 V is applied to the anode thereof. As a result, a reverse bias of substantially 2.0 V is applied between the anode and the cathode. The control circuit 122 sets the reset signal RST2 to "H", and then, supplies the start signal STV and the clock signal CK to the gate line drive circuit 15 to start the reset period Prst. During the reset period Prst, the control circuit 122 supplies the reference signal COM to the reset circuit 17 and supplies the reset signal RST2 to turn on the fourth switching elements TrR for supplying a reset voltage. This operation supplies the reference signal COM as the reset voltage to each of the signal lines SGL. The reference signal COM is set to, for example, 0.75 V.

During the reset period Prst, the gate line drive circuit 15 sequentially selects each of the gate lines GCL based on the start signal STV, the clock signal CK, and the reset signal RST1. The gate line drive circuit 15 sequentially supplies the gate drive signals Vgcl {Vgcl(1), . . . , Vgcl(M)} to the gate lines GCL. The gate drive signal Vgcl has a pulsed waveform having a power supply voltage VDD serving as a high-level voltage and a power supply voltage VSS serving as a low-level voltage. In FIG. 6, M gate lines GCL (where M is, for example, 256) are provided, and the gate drive signals Vgcl(1), . . . , Vgcl(M) are sequentially supplied to the respective gate lines GCL. Thus, the switching elements Tr are sequentially brought into a conducting state and supplied with the reset voltage on a row-by-row basis. For example, a voltage of 0.75 V of the reference signal COM is supplied as the reset voltage.

Specifically, as illustrated in FIG. 7, the gate line drive circuit 15 supplies the gate drive signal Vgcl(1) at the high-level voltage (power supply voltage VDD) to the gate line GCL(1) during a period V(1). The control circuit 122 supplies any one of selection signals ASW1, . . . , ASW6 (selection signal ASW1 in FIG. 7) to the signal line selection circuit 16 during a period in which the gate drive signal Vgcl(1) is at the high-level voltage (power supply voltage VDD). This operation couples the signal line SGL of the partial detection area PAA selected by the gate drive signal Vgcl(1) to the detection circuit 48. As a result, the reset voltage (reference signal COM) is also supplied to coupling wiring between the third switching element TrS and the detection circuit 48.

In the same manner, the gate line drive circuit 15 supplies the gate drive signals Vgcl(2), . . . , Vgcl(M−1), Vgcl(M) at the high-level voltage to gate lines GCL(2), . . . , GCL(M−1), GCL(M) during periods V(2), . . . , V(M−1), V(M), respectively.

Thus, during the reset period Prst, the capacitive elements Ca of all the partial detection areas PAA are sequentially electrically coupled to the signal lines SGL, and are supplied with the reference signal COM. As a result, the capacitance of the capacitive elements Ca is reset. The capacitance of the capacitive elements Ca of some of the partial detection areas PAA can be reset by partially selecting the gate lines and the signal lines SGL.

Examples of the exposure timing control method include a control method of exposure during non-selection of gate lines and a full-time control method of exposure. In the control method of exposure during non-selection of gate lines, the gate drive signals {Vgcl(1), . . . , Vgcl(M)} are sequentially supplied to all the gate lines GCL coupled to the photosensors PD serving as the detection targets, and all the photosensors PD serving as the detection targets are supplied with the reset voltage. Then, after all the gate lines GCL coupled to the photosensors PD serving as the detection targets are set to a low voltage (the switching elements Tr are turned off), the exposure starts and the exposure is performed during the exposure period Pex. In this control method of exposure during non-selection of gate lines, the light sources are on only during the exposure period Pex illustrated in FIG. 6. After the light sources are turned off and the exposure ends, the gate drive signals {Vgcl(1), . . . , Vgcl(M)} are sequentially supplied to the gate lines GCL coupled to the photosensors PD serving as the detection targets as described above, and reading is performed during the reading period Pdet. In the full-time control method of exposure, control for performing the exposure can also be performed during the reset period Prst and the reading period Pdet (full-time exposure control). In this case, an exposure period Pex(1) starts after the gate drive signal Vgcl(1) is supplied to the gate line GCL during the reset period Prst. The term "exposure periods Pex {(1), . . . , (M)}" refers to periods during which the capacitive elements Ca are charged from the photosensors PD. The electric charge stored in the capacitive element Ca during the reset period Prst causes a reverse directional current to flow (from cathode to anode) through the photosensor PD due to the light irradiation, and the potential difference across the capacitive element Ca decreases. The start timing and the end timing of the actual exposure periods Pex(1), . . . , Pex(M) are different among the partial detection areas PAA corresponding to the gate lines GCL. Each of the exposure periods Pex(1), . . . , Pex(M) starts when the gate drive signal Vgcl changes from the power supply voltage VDD serving as the high-level voltage to the power supply voltage VSS serving as the low-level voltage during the reset period Prst. Each of the exposure periods Pex(1), . . . , Pex(M) ends when the gate drive signal Vgcl changes from the power supply voltage VSS to the power supply voltage VDD during the reading period Pdet. The lengths of the exposure time of the exposure periods Pex(1), . . . , Pex(M) are equal. The present disclosure is not limited to the aspect in which the exposure periods Pex{(1), . . . , (M)} coincide with the lighting periods of the light sources. For example, it is sufficient that the light sources keep lighting at least during a period from the start of the exposure periods Pex(1) (the start of the reset period Prst for the exposure periods Pex(1)) to the end the exposure periods Pex(M) (the end of the reading period Pdet for the exposure periods Pex(M)).

In the control method of exposure during non-selection of gate lines, a current flows correspondingly to the light irradiating the photosensor PD in each of the partial detection areas PAA during the exposure periods Pex {(1), . . . , (M)}. As a result, the potential of each of the capacitive elements Ca decreases from the reset potential (0.75 V, for example).

At a time before the reading period Pdet starts, the control circuit 122 sets the reset signal RST2 to a low-level voltage. This operation stops operation of the reset circuit 17. The reset signal may be set to a high-level voltage only during the reset period Prst. During the reading period Pdet, the gate line drive circuit 15 sequentially supplies the gate drive signals Vgcl(1) . . . , Vgcl(M) to the gate lines GCL in the same manner as during the reset period Prst.

Specifically, as illustrated in FIG. 8, the gate line drive circuit 15 supplies the gate drive signal Vgcl(1) at the high-level voltage (power supply voltage VDD) to the gate line GCL(1) during a row reading period VR(1). The control circuit 122 sequentially supplies the selection signals ASW1, . . . , ASW6 to the signal line selection circuit 16 during the period in which the gate drive signal Vgcl(1) is at the high-level voltage (power supply voltage VDD). This operation sequentially or simultaneously couples the signal lines SGL of the partial detection areas PAA selected by the gate drive signal Vgcl(1) to the detection circuit 48. As a result, the detection signal Vdet for each of the partial detection areas PAA is supplied to the detection circuit 48.

In the same manner, the gate line drive circuit 15 supplies the gate drive signals Vgcl(2), . . . , Vgcl(M−1), Vgcl(M) at the high-level voltage to the gate lines GCL(2), . . . , GCL(M−1), GCL(M) during the row reading periods VR(2), . . . , VR(M−1), VR(M), respectively. That is, the gate line drive circuit 15 supplies the gate drive signal Vgcl to the gate line GCL during each of the row reading periods VR(1), VR(2), . . . , VR(M−1), VR(M). The signal line selection circuit 16 sequentially selects each of the signal lines SGL based on the selection signal ASW in each period in which the gate drive signal Vgcl is set to the high-level voltage. The signal line selection circuit 16 sequentially couples each of the signal lines SGL to one detection circuit 48. Thus, the detection device 100 can output the detection signals Vdet of all the partial detection areas PAA to the detection circuit 48 during the reading period Pdet.

With reference to FIG. 9, the following describes the operation example during the row reading period VR that is a supply period of one of the gate drive signals Vgcl(j) in FIG. 6. In FIG. 6, the reference sign of the row reading period VR is assigned to the first gate drive signal Vgcl(1). The same applies to the other gate drive signals Vgcl(2) . . . , Vgcl(M). The index j is any one of the natural numbers 1 to M.

As illustrated in FIGS. 9 and 4, an output (Vout) of each of the third switching elements TrS has been reset to the reference potential (Vref) voltage in advance. The reference potential (Vref) serves as the reset voltage, and is set to, for example, 0.75 V. Then, the gate drive signal Vgcl(j) is set to a high level, and the switching elements Tr in a corresponding row are turned on. Thus, each of the signal lines SGL of each row is set to a voltage corresponding to the electric charge stored in the capacitor (capacitive element Ca) of the partial detection area PAA. After a period t1 elapses from a rising edge of the gate drive signal Vgcl(j), a period t2 starts in which the selection signal ASW(k) is set to a high level. After the selection signal ASW(k) is set to the high level and the third switching element TrS is turned on, the electric charge stored in the capacitor (capacitive element Ca) of the partial detection area PAA coupled to the detection circuit 48 through the third switching element TrS changes the output (Vout) of the third switching element TrS (refer to FIG. 4) to a voltage corresponding to the electric charge stored in the capacitor (capacitive element Ca) of the partial detection area PAA (in a period t3). In the example of FIG. 9, this voltage is reduced from the reset voltage as illustrated in the period t3. Then, after the switch SSW is turned on (in a period t4 during which an SSW signal is set to a high level), the electric charge stored in the capacitor (capacitive element Ca) of the partial detection area PAA moves to the capacitor (capacitive element Cb) of the detection signal amplifier 42 of the detection circuit 48, and the output voltage of the detection signal amplifier 42 is set to a voltage corresponding to the electric charge stored in the capacitive element Cb. At this time, the potential of the inverting input portion of the detection signal amplifier 42 is an imaginary short-circuit potential of an operational amplifier, and therefore, set to the reference potential (Vref). The A/D converter 43 reads the output voltage of the detection signal amplifier 42. In the example of FIG. 9, waveforms of selection signals ASW(k), ASW(k+1), . . . corresponding to the signal lines SGL of the respective columns are set to a high level to sequentially turn on the third switching elements TrS, and the same operation is sequentially performed. This operation sequentially reads the electric charges stored in the capacitors (capacitive elements Ca) of the partial detection areas PAA coupled to the gate line GCL. ASW(k), ASW(k+1), . . . in FIG. 9 are, for example, any of ASW 1 to 6 in FIG. 9.

Specifically, after the period t4 starts in which the switch SSW is on, the electric charge moves from the capacitor (capacitive element Ca) of the partial detection area PAA to the capacitor (capacitive element Cb) of the detection signal amplifier 42 of the detection circuit 48. At this time, the non-inverting input (+) of the detection signal amplifier 42 is biased to the reference potential (Vref) voltage (for example, 0.75 V). As a result, the output (Vout) of the third switching element TrS is also set to the reference potential (Vref) voltage due to the imaginary short-circuit between input ends of the detection signal amplifier 42. The voltage of the capacitive element Cb is set to a voltage corresponding to the electric charge stored in the capacitor (capacitive element Ca) of the partial detection area PAA at a location where the third switching element TrS is turned on in response to the selection signal ASW(k). After the output (Vout) of the third switching element TrS is set to the reference potential (Vref) voltage due to the imaginary short-circuit, the output of the detection signal amplifier 42 reaches a voltage corresponding to the capacitance of the capacitive element Cb, and this output voltage is read by the A/D converter 43. The voltage of the capacitive element Cb is, for example, a voltage between two electrodes provided on a capacitor constituting the capacitive element Cb.

The period t1 is, for example, 20 μs. The period t2 is, for example, 60 μs. The period t3 is, for example, 44.7 μs. The period t4 is, for example, 0.98 μs.

As illustrated in FIG. 10, the detection device 100 performs the processing in the reset period Prst, the exposure periods Pex {(1), . . . , (M)}, and the reading period Pdet described above in each of a period t(1), a period t(2), a period t(3), and a period t(4). In the reset period Prst and the reading period Pdet, the gate line drive circuit 15 sequentially scans the gate lines GCL(1) to GCL(M). In the following description, "detection of one frame" denotes the detection in each period t, that is, the detection for acquiring the detection signals Vdet from the signal lines SGL in the respective columns by scanning the gate lines GCL(1) to GCL(M) in the reset period Prst and the reading period Pdet.

The control circuit 122 can control the lighting and the non-lighting of the light sources according to the detection target. FIG. 10 illustrates an example in which the first light sources 61 are on during the periods t(1) and t(3), and the second light sources 62 are on during the periods t(2) and t(4). That is, in the example illustrated in FIG. 10, the control circuit 122 alternately turns on and off the first light sources 61 and the second light sources 62 for each detection of one frame. The present disclosure is not limited to this example. For example, the control circuit 122 may turn on and off the first light sources 61 and the second light sources 62 at intervals of a predetermined period of time, or may successively turn on either of the first and the second light sources 61 and 62.

Although FIGS. 6 to 10 illustrate the example in which the gate line drive circuit 15 individually selects the gate line GCL, the present disclosure is not limited to this example. The gate line drive circuit 15 may simultaneously select a predetermined number (two or more) of the gate lines GCL, and sequentially supply the gate drive signals Vgcl to the gate lines GCL in units of the predetermined number of the gate lines GCL. The signal line selection circuit 16 may also simultaneously couple a predetermined number (two or more) of the signal lines SGL to one detection circuit 48. Moreover, the gate line drive circuit 15 may skip some of the gate lines GCL and scan the remaining ones.

As illustrated in FIG. 8, in the row reading period VR(1), the selection signals ASW1, . . . , ASW6 are sequentially supplied to the signal line selection circuit 16 during the period in which the gate drive signal Vgcl(1) is at the high-level voltage (power supply voltage VDD). That is, even after the selection signal ASW1 is set to a low-level voltage at time t11, the exposure continues during an exposure period Pex-1 until the gate drive signal Vgcl(1) is set to the low-level voltage at time t13. An electric charge corresponding to the exposure period Pex-1 is supplied from the photosensor PD to the signal line SGL(1) corresponding to the selection signal ASW1.

In the same manner, an electric charge is supplied to each of the signal lines SGL during a corresponding one of exposure periods Pex-1, . . . , Pex-6 corresponding to the selection signals ASW1, . . . , ASW6, respectively. For example, the exposure period Pex-6 is a period after the selection signal ASW6 is set to the low-level voltage at time t12 until the gate drive signal Vgcl (1) is set to the low-level voltage at time t13. The exposure period Pex differs column by column.

In the next row reading period VR(2), the detection circuit 48 is supplied with a signal obtained by adding an electric charge stored during the exposure periods Pex-1(SGL(1)), . . . , Pex-6(SGL(6)) of the previous row reading period VR(1) to the detection signal Vdet of the second row.

Figure 11:
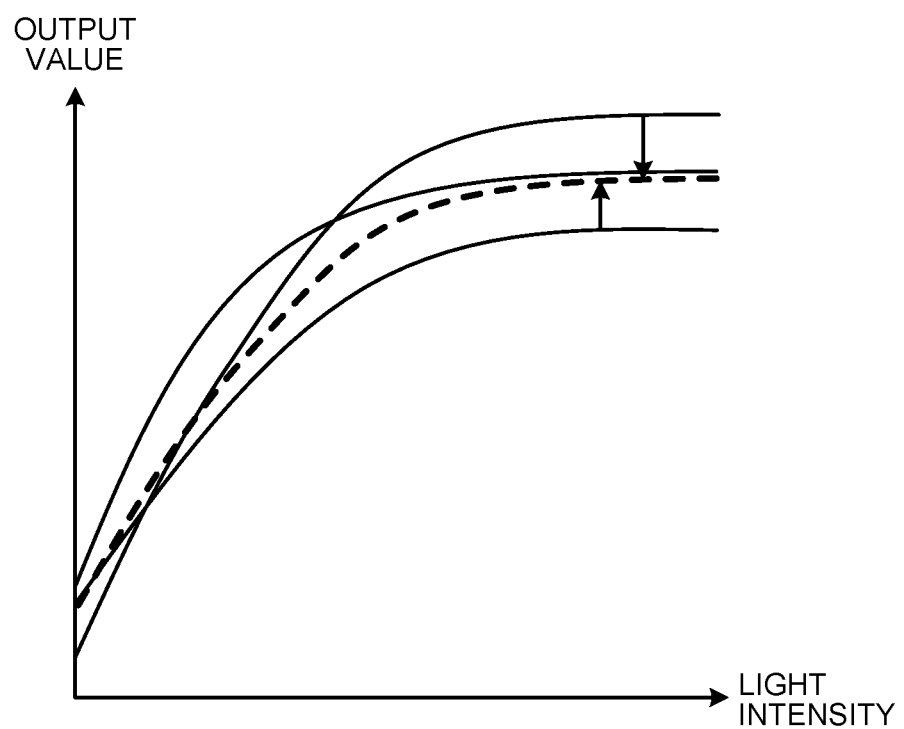
FIG. 11 is a diagram illustrating a relation between an output value of a detector and an intensity of light irradiating a photosensor.

FIG. 11 is a diagram illustrating a relation between an output value of the detector and an intensity of the light irradiating the photosensor.

The photosensors PD provided in the detection area AA of the sensor 10 have individually different characteristics. As a result, as indicated by the solid lines in FIG. 11, variation occurs in output values of the detection circuit 48 with respect to the intensity of the irradiating light. Such variation can cause a reduction in detection accuracy due to the variation in the characteristics of the photosensors PD provided on the sensor substrate 21 of the same sensor 10, and variation in detection results between the different sensors 10 due to the variation in the characteristics of the photosensors PD.

In the detection device 100 according to the present disclosure, the storage 46 holds a correction value according to the intensity of the irradiating light for each of the photosensors PD provided in the detection area AA of the sensor 10, and the detection processing applies the correction values held in the storage 46 to compensate for the variation in the output values caused by the variation in the characteristics of the photosensors PD so as to make each of the output values equal to a reference value indicated by a dashed line in FIG. 11.

Figure 12:
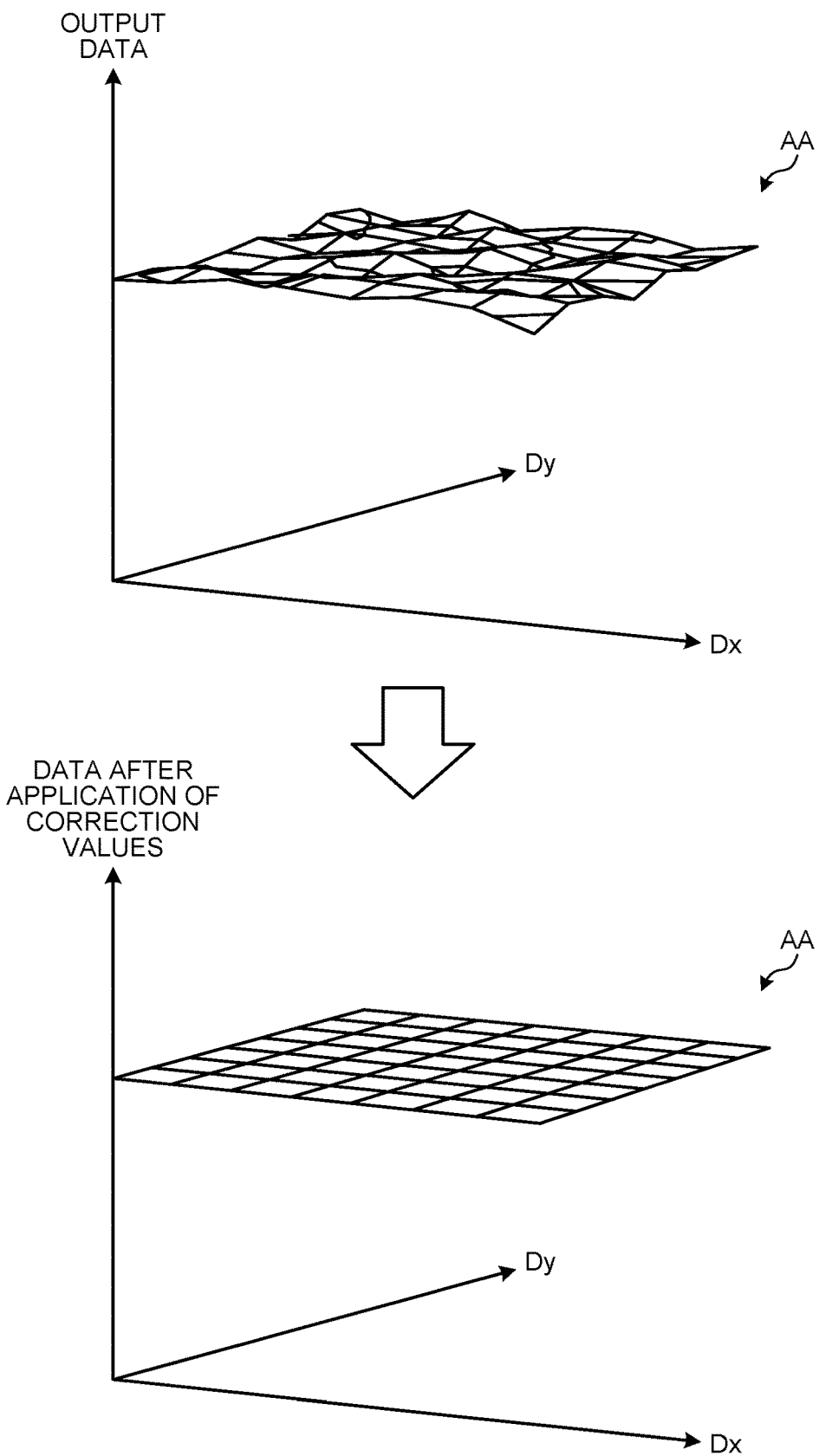
FIG. 12 is a schematic diagram illustrating a correlation between before and after application of correction values in detection processing.

FIG. 12 is a schematic diagram illustrating a correlation between before and after the application of the correction values in the detection processing. FIG. 12 illustrates an example in which all the photosensors PD in the detection area AA are irradiated with light at the same intensity.

As illustrated in the upper portion of FIG. 12, the output data value of the detection circuit 48 before the application of the correction value is different for each of the photosensors PD in the detection area AA of the sensor 10. As illustrated in the lower portion of FIG. 12, the detection device 100 according to the present disclosure can compensate for the variation in the output data values of the detection circuit 48 such that the output data values become a uniform data value by applying the correction value for each of all the photosensors PD in the detection area AA to each output data value.

FIG. 13 is a chart illustrating an example of the correction value data. As illustrated in FIG. 13, the correction value data includes the correction values for all the photosensors PD in the detection area AA, respectively, for each of the output data values L(i) (i is an integer from 1 to I) of the detection circuit 48. In the present disclosure, the signal processor 44 applies the correction value data held in the storage 46 to compensate for the variation in the output values caused by the variation in the characteristics of the photosensors PD. Specifically, for example, when the output data value of the detection circuit 48 corresponding to a photosensor PD(n, m) (photosensor PD in an n-th position in the first direction Dx and an m-th position in the second direction Dy) is L(i)(n, m), the signal processor 44 uses Expression (1) below to calculate a corrected data value L(i)(n, m)'.

$$L(i)(n,m)'=L(i)(n,m)+\Delta L(i)(n,m) \quad (1)$$

This correction can restrain the reduction of the detection accuracy that would be caused by the variation in the characteristics of the photosensors PD provided in the detection area AA of the sensor 10. By generating the correction value data illustrated in FIG. 13 using the reference values indicated by the dashed line in FIG. 11, the variations in the detection results between the different sensors 10 can be restrained from occurring due to the variation in the characteristics of the photosensors PD. The present disclosure is not limited by the method of generating the correction value data illustrated in FIG. 13.

The combination of the sensor 10 and the controller 20 may be changed depending on, for example, the use condition and application of the detection device 100. Specifically, for example, at a place of medical treatment or the like, the sensor 10 is assumed to be replaced for each person to be examined or for each examination from the viewpoint of sanitation or prevention of spread of infections. In such an operation, the correction value data held in the storage 46 needs to be replaced each time the sensor 10 is replaced. For example, the sensor 10 can be considered to be combined with the controller 20 after a device incorporating the controller 20 is shipped. The following describes a configuration for reflecting the correction value data for each of the sensors 10 to the storage 46 of the controller 20.

Figure 14:
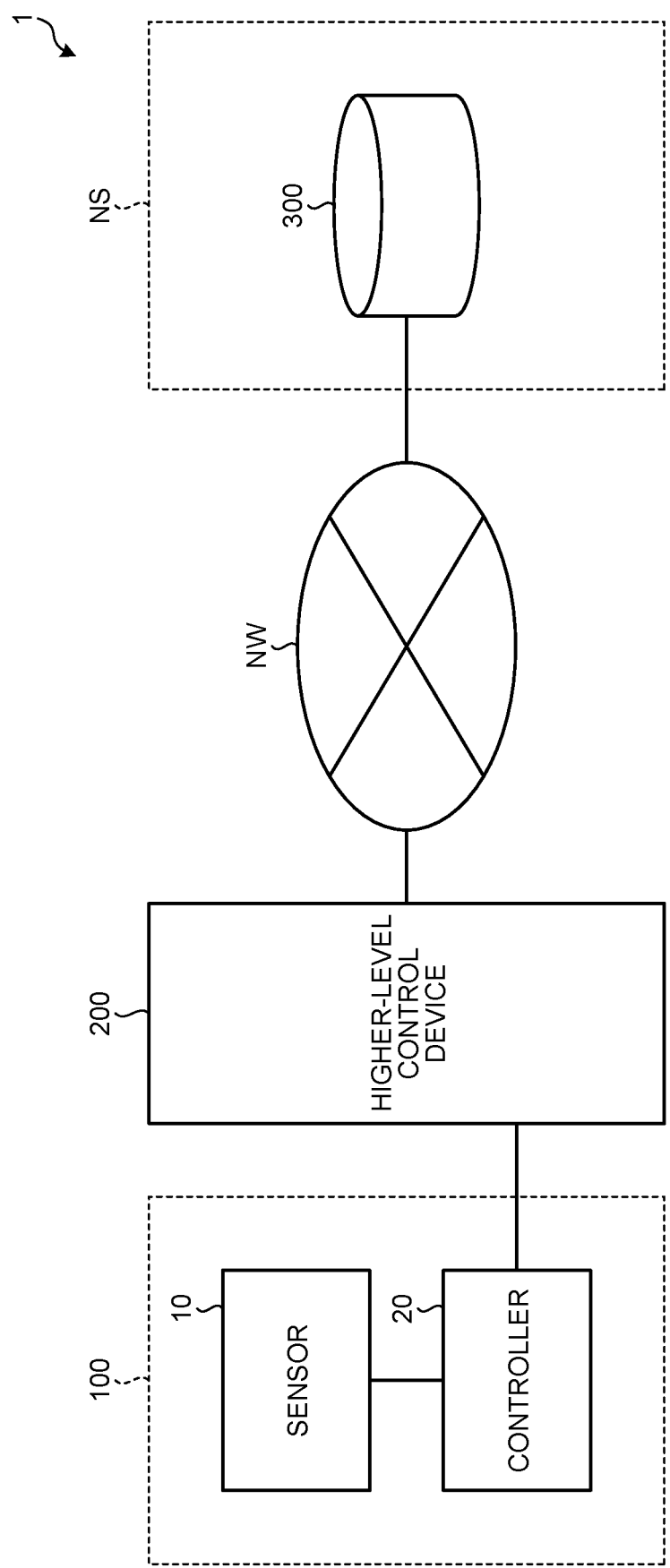
FIG. 14 is a diagram illustrating a configuration of the detection system according to the embodiment.

FIG. 14 is a diagram illustrating a configuration of the detection system according to the embodiment. As illustrated in FIG. 14, a detection system 1 according to the embodiment includes the detection device 100 including the sensor 10 and the controller 20 described above, a host control device (higher-level control device) 200, and a data storage 300.

The data storage 300 is provided, for example, on a network server NS on a cloud platform. The data storage 300 stores therein the correction value data (refer to FIG. 13) for the sensor 10.

The data storage 300 is exemplified by, for example, a hard disk on the network server NS. The data storage 300 stores therein the correction value data corresponding to the sensors 10. A plurality of pieces of the correction value data are each associated with the sensor 10 via an identification code. The identification code is individually assigned to each of the sensors 10.

FIG. 15 is a chart illustrating the correction value data corresponding to the sensors that is stored in the data storage.

The data storage 300 stores therein the correction value data illustrated in FIG. 13 (data 1, 2, . . . , q, . . . , Q in FIG. 15) associated with the identification codes (00 . . . 001, 00 . . . 010, . . . ,  . . . *, 11 . . . 111) corresponding to the sensors 10.

The controller 20 communicates with the host control device 200. Specifically, for example, the interface circuit 126 (refer to FIG. 1) and the host control device 200 are coupled by wire together through a USB cable to perform wired communication with each other. The host control device 200 wirelessly communicates with the network server NS through a network NW.

Figure 16:
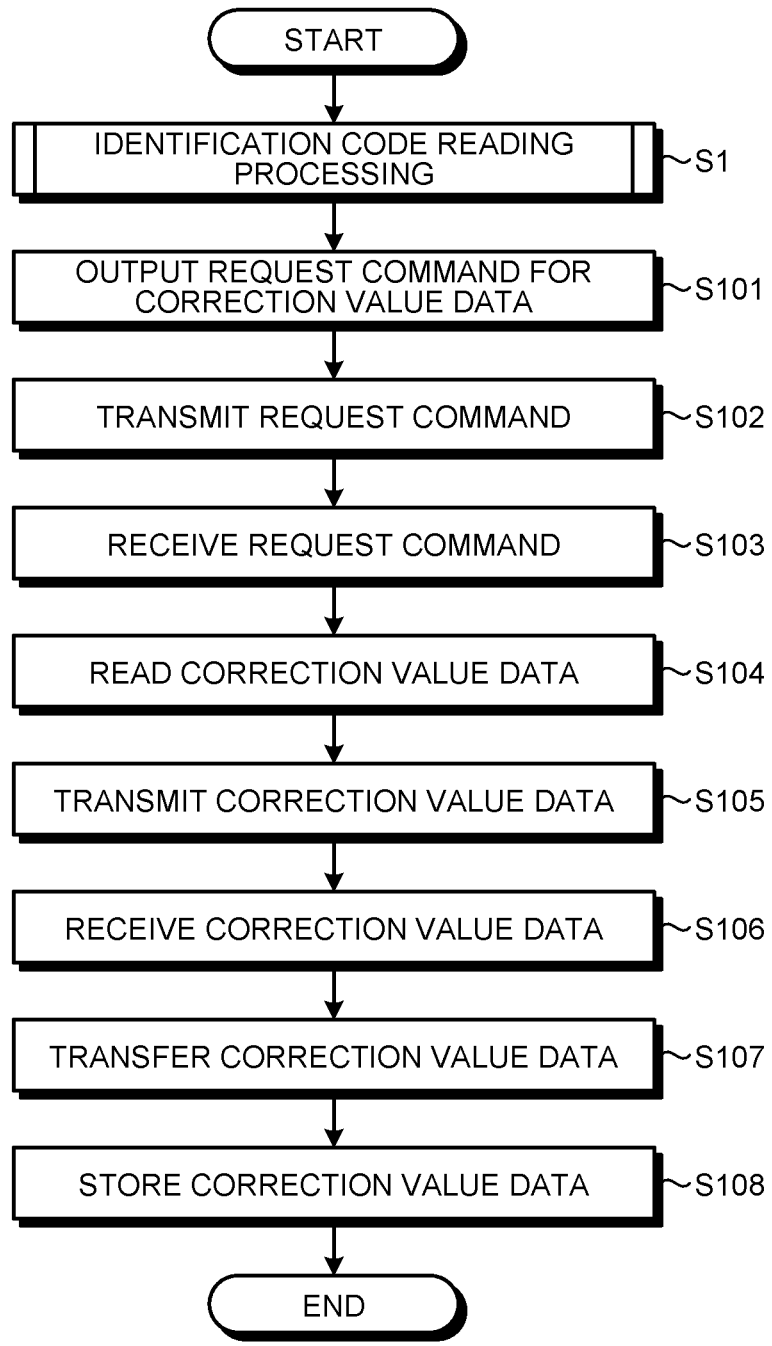
FIG. 16 is a flowchart illustrating an example of correction value data acquisition processing.

FIG. 16 is a flowchart illustrating an example of correction value data acquisition processing.

In acquiring the correction value data, after identification code reading processing to be described later is performed (Step S1), the controller 20 outputs a request command for the correction value data with the identification codes of the sensors 10 attached thereto to the host control device 200 (Step S101), and the host control device 200 transmits the request command to the network server NS (Step S102). After the network server NS receives the request command for the correction value data (Step S103), the network server NS reads the correction value data corresponding to the identification codes from the data storage 300 (Step S104), and transmits the correction value data to the host control device 200 (Step S105). After the host control device 200 receives the correction value data (Step S106), the host control device 200 transfers the correction value data to the detection device 100 (Step S107). The controller 20 stores the transferred correction value data in the storage 46 (Step S108), and ends the correction value data acquisition processing.

The configuration of the detection system 1 is not limited to the aspect illustrated in FIG. 14. For example, in an aspect of the present disclosure, the controller 20 may have a function of wireless communication with the network server NS. In this case, in an aspect of the present disclosure, the controller 20 may wirelessly communicate with the network server NS through the network NW. The data storage 300 is not limited to the aspect of being provided on the network server NS on the cloud platform. For example, in an aspect of the present disclosure, the data storage 300 may be provided in the host control device 200. In this case, the data storage 300 is exemplified by, for example, a hard disk provided in the host control device 200.

The identification code of each of the sensors 10 is information unique to the sensor 10. The identification code of the sensor 10 corresponds one-to-one to the correction value data. In the present disclosure, when outputting the request command for the correction value data with the identification codes unique to the sensors 10 attached thereto at Step S101 of the correction value data acquisition processing described above, the controller 20 reads the identification code of the sensor 10 using the photosensors PD provided in the sensor 10. The following describes aspects of the identification code according to the embodiments.

First Embodiment

Figure 17:
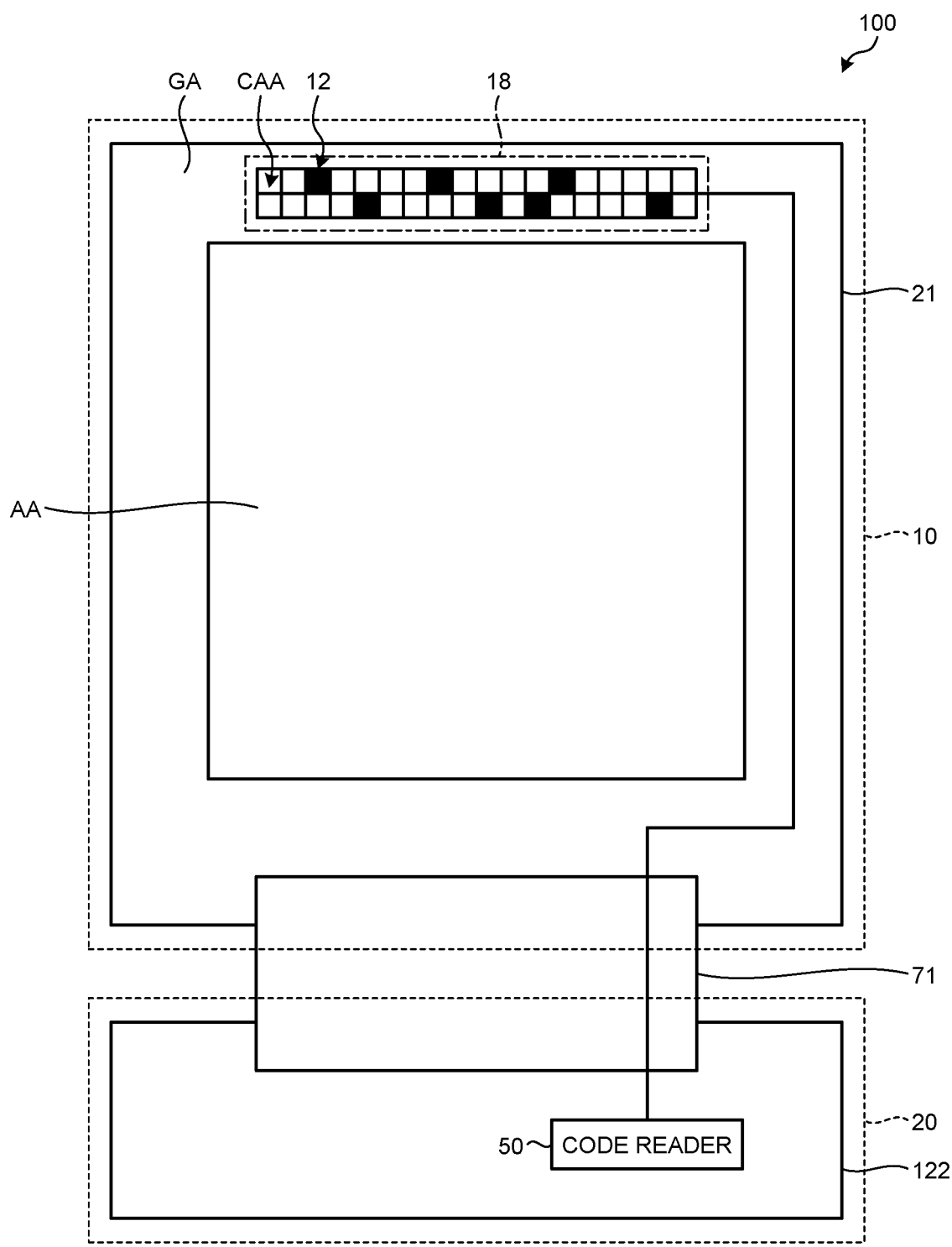
FIG. 17 is a diagram illustrating an aspect of an identification code according to a first embodiment.

FIG. 17 is a diagram illustrating an aspect of the identification code according to a first embodiment. In the example illustrated in FIG. 17, an individual identifier 18 is provided in the peripheral area GA outside the detection area AA of the sensor 10.

The individual identifier 18 is provided with a plurality of code detection areas CAA. The code detection areas CAA in the individual identifier 18 have the same configuration as the partial detection areas PAA in the detection area AA and are each provided with the photosensor PD. The individual identifier 18 is partially blocked from light by a light-blocking pattern 12 provided over the code detection areas CAA corresponding to the identification code of the sensor 10. While FIG. 17 illustrates an example in which 18 code detection areas CAA are arranged in the first direction Dx and 2 code detection areas CAA are arranged in the second direction Dy, the aspect of the individual identifier 18 is not limited to this example. The position where the individual identifier 18 is provided is not limited to the example illustrated in FIG. 17.

In the example illustrated in FIG. 17, the controller 20 is provided with a code reader 50. In an aspect of the present disclosure, the code reader 50 may be included in, for example, the control circuit 122 or the detection circuit 48.

Figure 18:
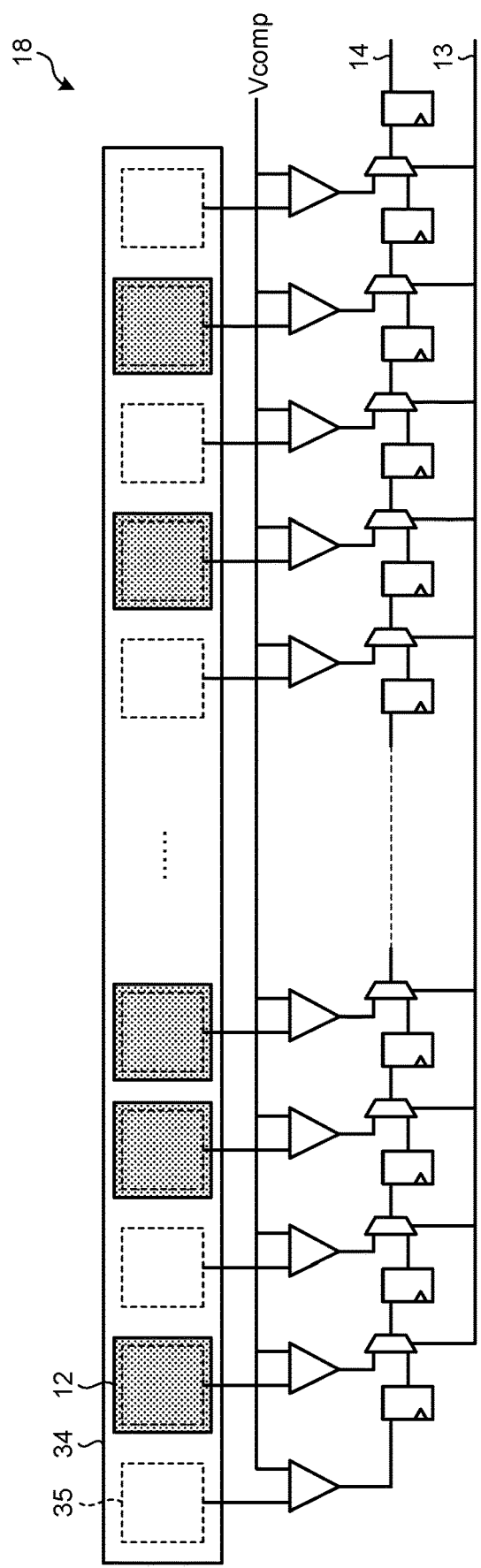
FIG. 18 is a diagram illustrating an example of a circuit configuration of an individual identifier.

FIG. 18 is a diagram illustrating an example of a circuit configuration of the individual identifier. In the identification code reading processing (Step S1) of the correction value data acquisition processing illustrated in FIG. 16, the code reader 50 controls a switch control line 13 of the individual identifier 18 to read the identification code defined by the individual identifier 18 through a readout line 14, and outputs the read identification code as serial data.

Figure 19:
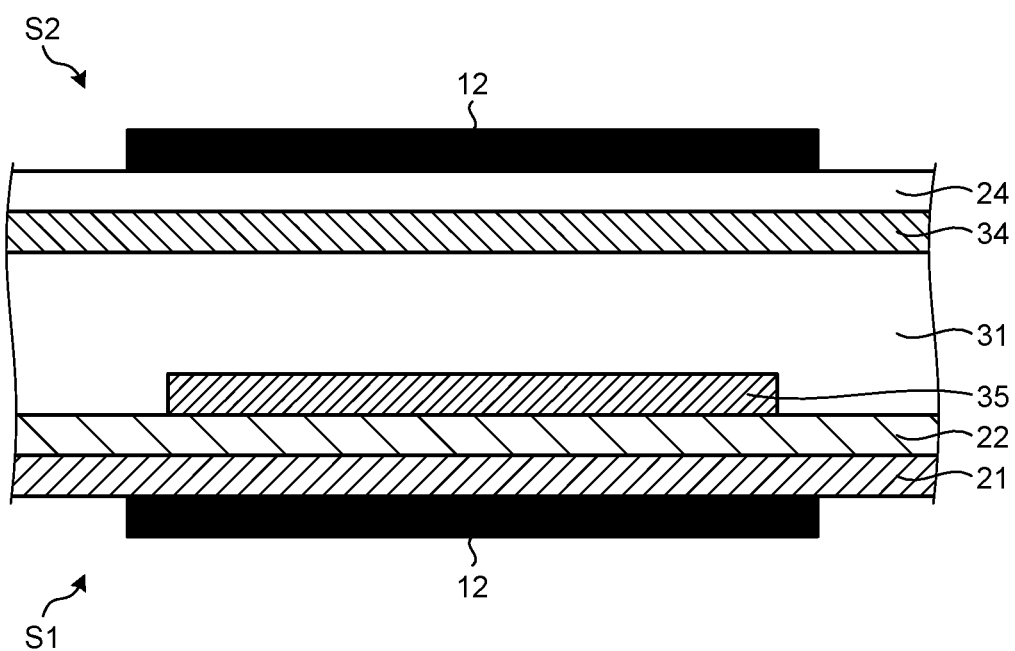
FIG. 19 is a view illustrating a schematic sectional configuration of a code detection area.

FIG. 19 is a view illustrating a schematic sectional configuration of the code detection areas. As illustrated in FIG. 19, in an aspect of the present disclosure, the light-blocking pattern 12 may be provided on the first surface S1 on the lower electrode 35 side or on the second surface S2 on the upper electrode 34 side.

At the time of acquisition of the correction value data, detection values corresponding to the photosensors PD in the code detection areas CAA blocked from light by the light-blocking pattern 12 greatly differ from detection values corresponding to the photosensors PD in the other code detection areas CAA. Each of the detection values is compared with a reference value Vcomp using a comparator in FIG. 18 to be converted into a digital value and is read by the detector 40 as the identification code.

Modification

Figure 20:
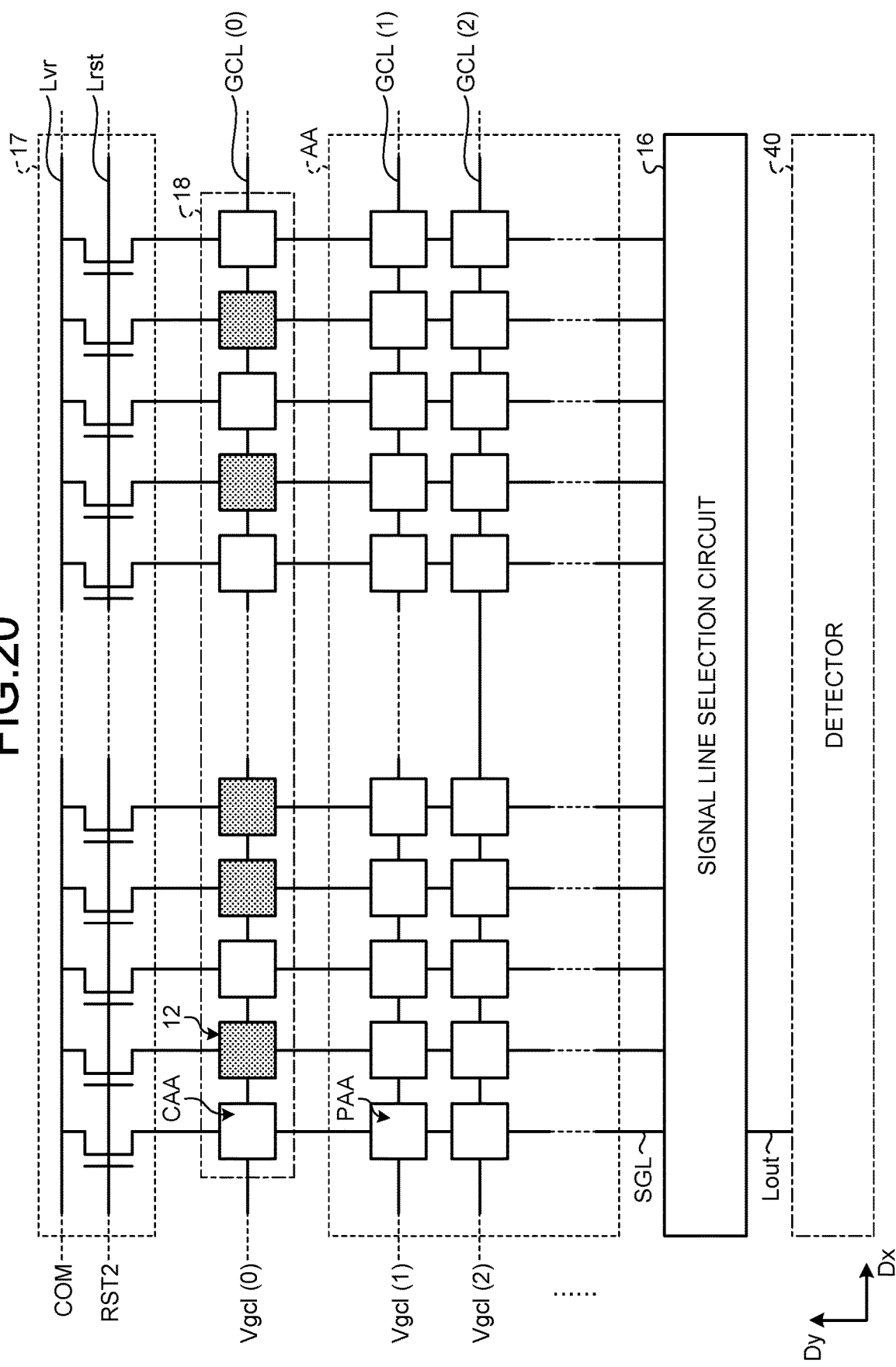
FIG. 20 is a diagram illustrating an aspect of the individual identifier according to a modification of the first embodiment.

FIG. 20 is a diagram illustrating an aspect of the individual identifier according to a modification of the first embodiment. In the modification of the first embodiment illustrated in FIG. 20, the individual identifier 18 having the code detection areas CAA arranged in the first direction Dx is provided between the reset circuit 17 and the detection area AA.

Each of the code detection areas CAA is provided with a photosensor in the same manner as the partial detection areas PAA in the detection area AA and includes a capacitive element formed in the photosensor and a switching element provided corresponding to the photosensor. The configuration in the code detection areas CAA is the same as that in the partial detection areas PAA in the detection area AA illustrated in FIG. 4 and therefore will not be described in detail.

The gate of the switching element in each of the code detection areas CAA is coupled to a gate line GCL(0). The source of the switching element is coupled to a corresponding one of the signal lines SGL. The drain of the switching element is coupled to the cathode of the photosensor and the capacitive element in the code detection area CAA.

In the aspect of the modification of the first embodiment illustrated in FIG. 20, the identification code defined by the individual identifier 18 is read by the detector 40 through the signal line selection circuit 16. That is, in the aspect illustrated in FIG. 20, the identification code can be read without separately providing a code reader.

FIG. 20 illustrates an example in which the code detection areas CAA are provided correspondingly to the adjacent signal lines SGL. However, in an aspect of the present disclosure, the code detection areas CAA may be provided corresponding to signal lines SGL(Mn) (where n is an integer equal to or larger than one) arranged at intervals of a multiple of M (where M is an integer equal to or larger than two), such as SGL(2n), SGL(3n), or SGL(4n), or signal lines SGL(P+Mn) (where P is an integer equal to or larger than one). Alternatively, in an aspect of the present disclosure, the code detection areas CAA may be provided so as to be arranged in the second direction Dy, or the code detection areas CAA may be provided in Q rows and R columns (where Q and R are integers equal to or larger than one).

Second Embodiment

Figure 21:
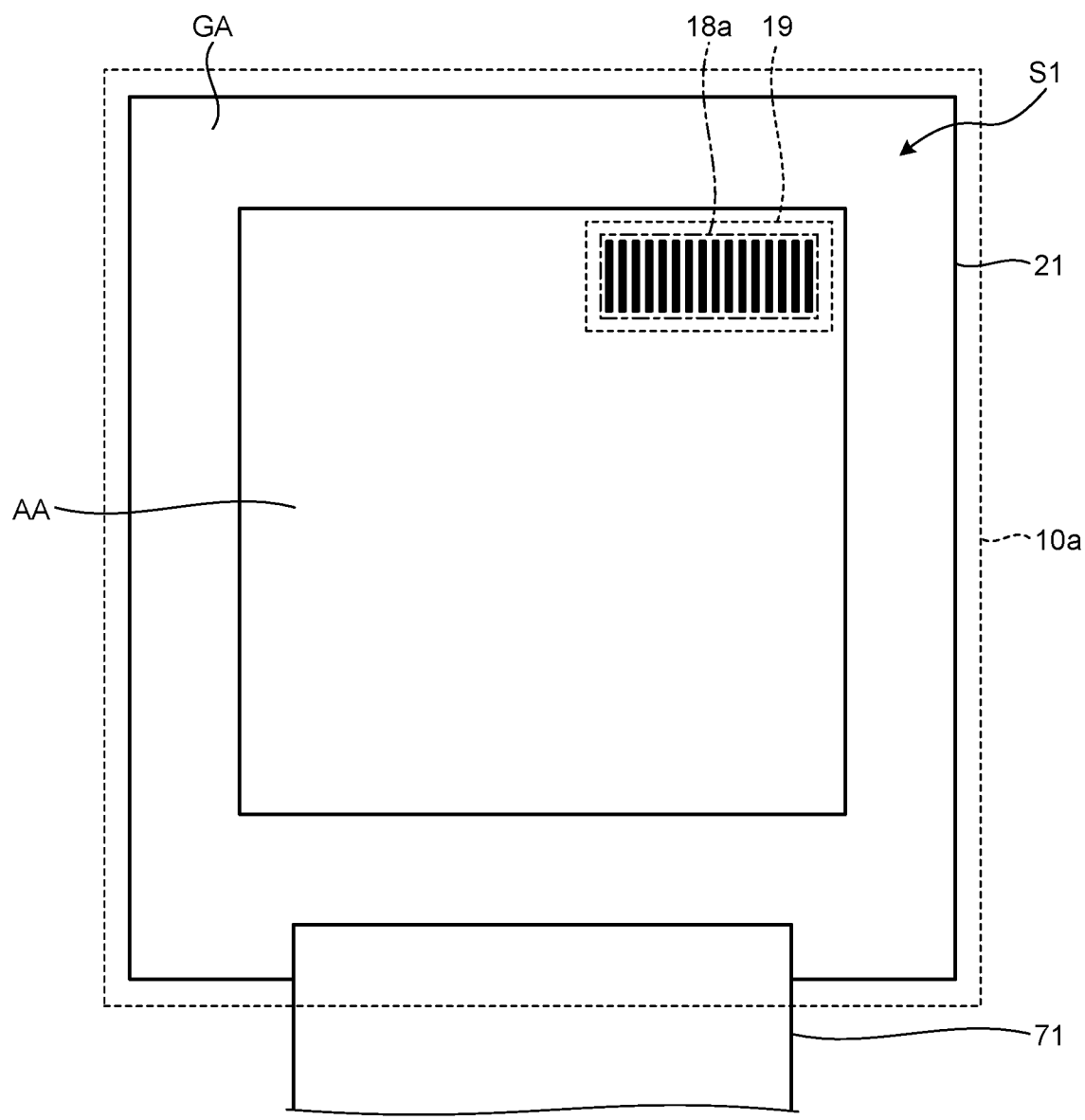
FIG. 21 is a diagram illustrating an aspect of the identification code according to a second embodiment.

FIG. 21 is a diagram illustrating an aspect of the identification code according to a second embodiment. In the example illustrated in FIG. 21, an individual identifier 18a is provided so as to overlap the detection area AA of a sensor 10a.

In an aspect of the present embodiment, the detector 40 reads the identification code defined by the individual identifier 18a in acquisition of the correction value data in the same manner as in the modification of the first embodiment. However, the present embodiment differs from the first embodiment in that the individual identifier 18a is provided so as to overlap the detection area AA.

In the present embodiment, the first surface S1 serves as a detection surface used when detecting the biological information. In the example illustrated in FIG. 21, the individual identifier 18a is provided on the first surface S1 of the sensor substrate 21, and the back side of the first surface S1 (second surface S2) is blocked from light. In the present embodiment, for example, a transparent sheet 19 with a bar code printed thereon is attached as the individual identifier 18a to the detection area AA of the sensor 10a. After the correction value data acquisition processing illustrated in FIG. 16, the transparent sheet 19 is removed, and the biological information is detected. While FIG. 21 illustrates the example in which the transparent sheet 19 is attached only to the area including the bar code, the transparent sheet 19 may have a protective sheet-like configuration covering the entire surface of the detection area AA.

Figure 22:
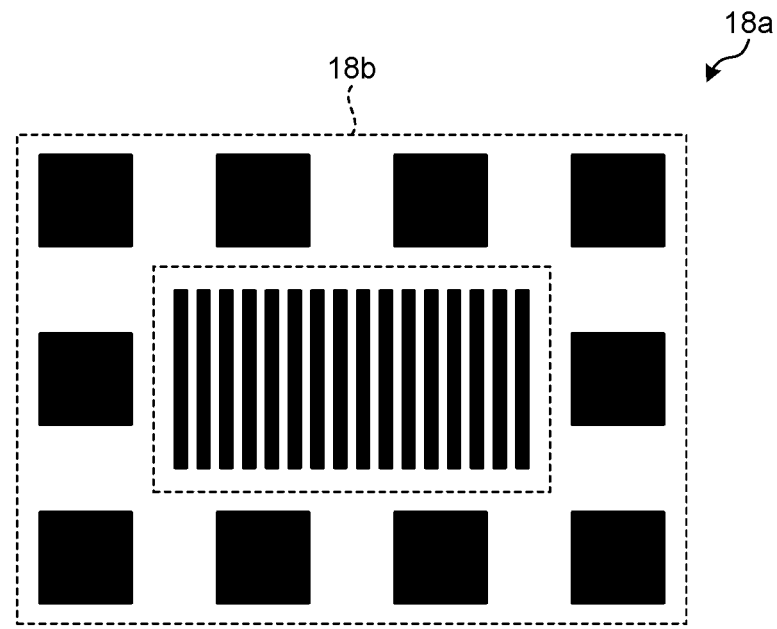
FIG. 22 is a diagram illustrating an example of an aspect of an individual identifier according to the second embodiment.

FIG. 22 is a diagram illustrating an example of an aspect of the individual identifier according to the second embodiment. As illustrated in FIG. 22, in an aspect of the present disclosure, the individual identifier 18a may include, for example, a position detection pattern 18b around the bar code. The position detection pattern 18b has a specific shape indicating the position of the bar code. This configuration allows the detector 40 to accurately trace the position of the individual identifier 18a in acquisition of the correction value data. The shape of the position detection pattern 18b is not limited to the aspect illustrated in FIG. 22.

In acquisition of the correction value data, detection values corresponding to the photosensors PD blocked from light by the individual identifier 18a of the aspect described above greatly differ from detection values corresponding to the other photosensors PD in the detection area AA. In acquisition of the correction value data, the detector 40 can read the identification code defined by the individual identifier 18a by scanning the entire surface of the detection area AA and comparing the detection value corresponding to the photosensors PD with a predetermined threshold.

Figure 23:
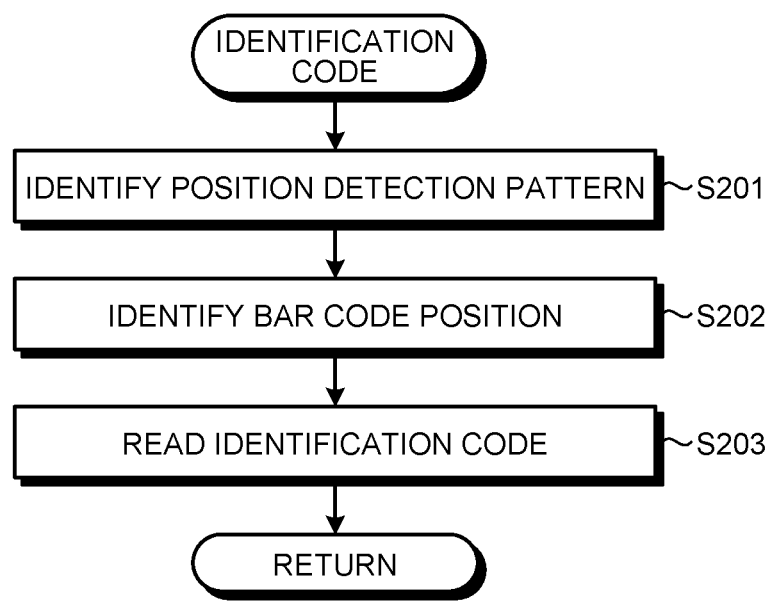
FIG. 23 is a flowchart illustrating an example of identification code reading processing according to the second embodiment.

FIG. 23 is a flowchart illustrating an example of the identification code reading processing according to the second embodiment. In the identification code reading processing (Step S1) of the correction value data acquisition processing illustrated in FIG. 16, the detector 40 scans the entire surface of the detection area AA to identify the position detection pattern 18b (Step S201), identifies the position of the bar code based on the identified position detection pattern 18b (Step S202), and reads the identification code defined by the individual identifier 18a (Step S203).

Third Embodiment

Figure 24:
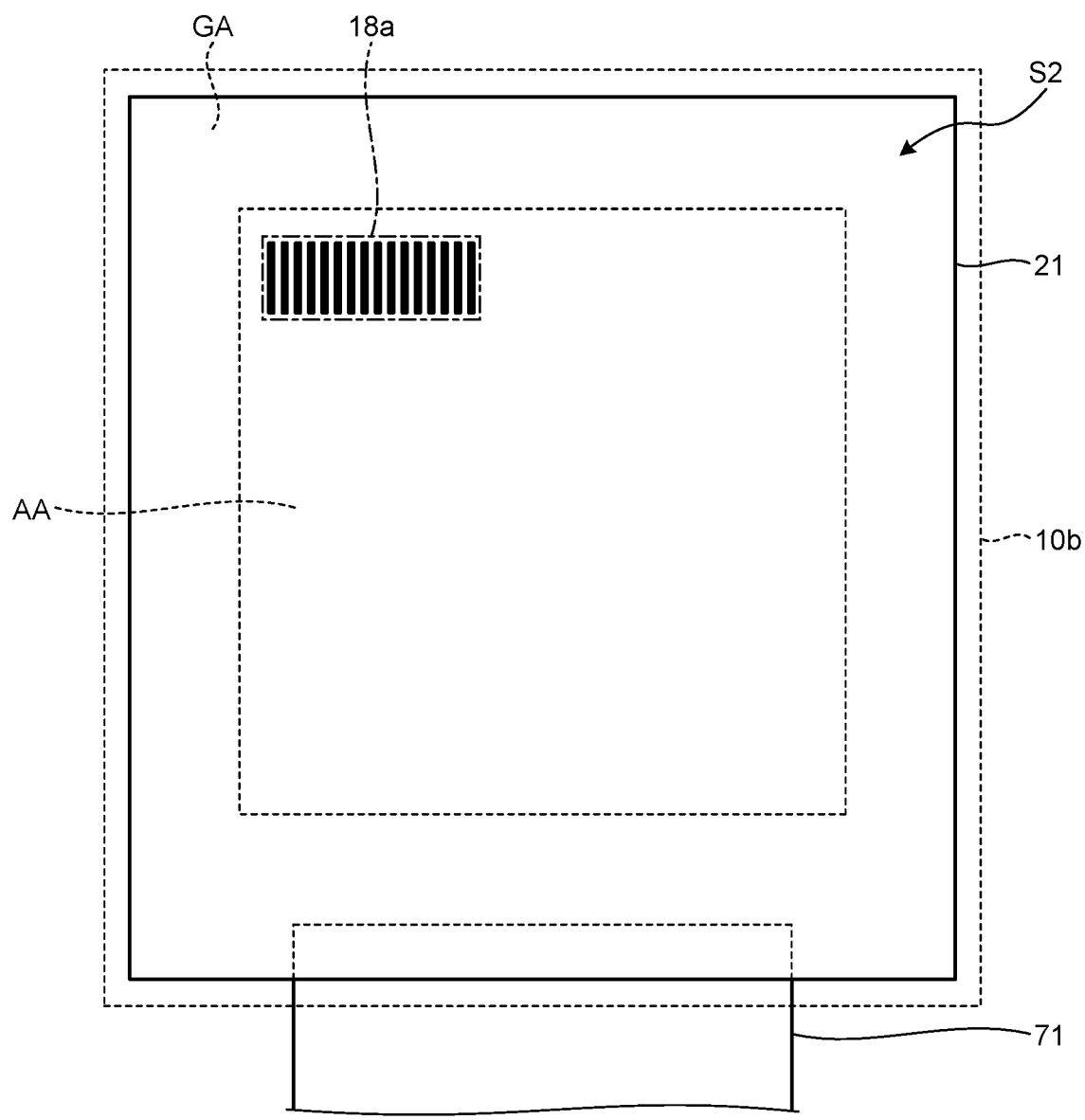
FIG. 24 is a diagram illustrating an aspect of the identification code according to a third embodiment.

FIG. 24 is a diagram illustrating an aspect of the identification code according to a third embodiment. In the example illustrated in FIG. 24, the individual identifier 18a is provided on the back side (second surface S2) of the detection surface used when detecting the biological information.

In acquisition of the correction value data of the present embodiment, the detector 40 reads the identification code defined by the individual identifier 18a in the same manner as in the second embodiment.

In the present embodiment, the bar code for the individual identifier 18a is printed on the second surface S2. As described above, the light emitted from the second surface S2 side can be detected by forming the upper electrode 34 of a light-transmitting conductive material or a light-transmitting transflective electrode.

Figure 25:
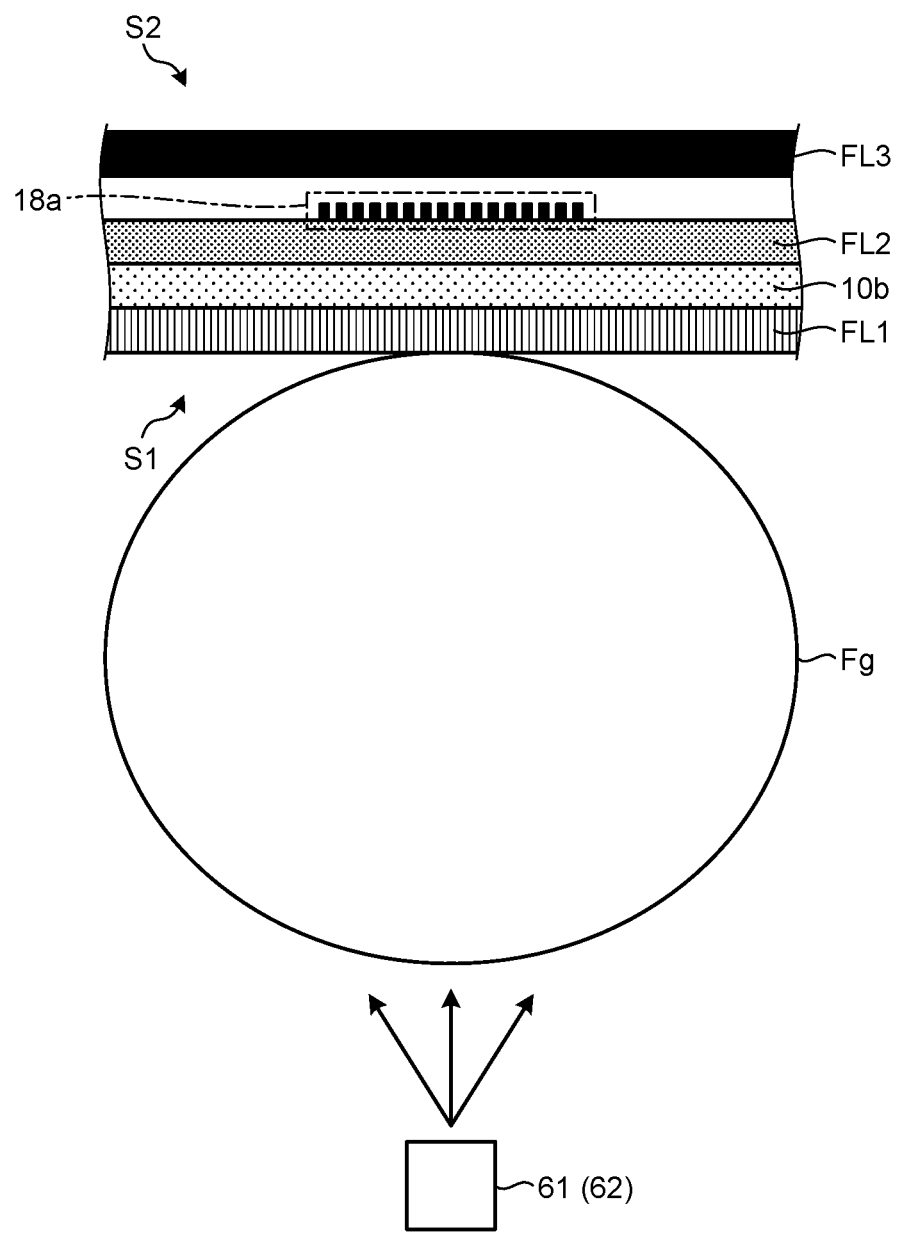
FIG. 25 is a diagram explaining a specific example of a configuration provided with the individual identifier according to the third embodiment.

FIG. 25 is a diagram explaining a specific example of a configuration provided with the individual identifier according to the third embodiment. As a specific example of applying a sensor 10b according to third embodiment, an example of detecting, for example, the pulse wave of the finger Fg and the vascular pattern of the veins. In FIG. 25, each of the first light sources 61 (or the second light sources 62) emits red light or infrared light.

Optical films are provided on the first surface S1 side and the second surface S2 side of the sensor 10b. A film FL1 transmits light traveling in a direction in which holes are formed toward the photosensors PD, and attenuates light traveling in the other directions. The film FL1 is also called, for example, collimating apertures or a collimator. A film FL2 cuts off light having wavelengths of, for example, 600 nm and below. In addition, a light-blocking film FL3 is provided on the second surface S2 side of the sensor 10b.

In the third embodiment, the correction value data acquisition processing illustrated in FIG. 16 is performed to acquire the correction value data for the sensor 10b, and the light-blocking film FL3 is attached after the correction value data is acquired. That is, in the identification code reading processing (Step S1) of the correction value data acquisition processing illustrated in FIG. 16, the detector 40 can read the identification code defined by the individual identifier 18a using visible light transmitted through the film FL2 from the second surface S2 side of the sensor 10b.

After the correction value data for the sensor 10b is acquired, the light-blocking film FL3 is attached, and the first light sources 61 (or the second light sources 62) are turned on when detecting biological information. As a result, the detector 40 can detect the biological information (such as the pulse wave of the finger Fg and the vascular pattern of the veins or the like) using the red light or the infrared light transmitted through the film FL1 from the first surface S1 side of the sensor 10b.

In an aspect of the present disclosure, for example, the transparent sheet 19 with the bar code printed thereon may be attached as the individual identifier 18a in the same manner as in the second embodiment. In an aspect of the present disclosure, the individual identifier 18a may be provided with, for example, a position detection pattern 18b around the bar code. The position detection pattern 18b has a specific shape indicating the position of the bar code.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modifications described above.

What is claimed is:

1. A detection system comprising:
   a sensor provided with a plurality of photosensors in a detection area;
   a controller configured to control the sensor; and
   a data storage configured to store correction value data including correction values for detection values of the photosensors and identification codes of a plurality of the sensors in such a manner that the identification codes are associated one-to-one with the correction value data, wherein
   the controller is configured to acquire the correction value data corresponding to the identification code of the sensor from the data storage and correct the detection values of the photosensors based on the acquired correction value data.

2. The detection system according to claim 1, wherein the sensor comprises an individual identifier that defines the identification code.

3. The detection system according to claim 2, wherein the individual identifier is provided in a peripheral area outside the detection area.

4. The detection system according to claim 3, wherein
   the individual identifier is provided with a plurality of code detection areas each provided with one of the photosensors, and
   the code detection areas are blocked from light depending on the identification code.

5. The detection system according to claim 2, wherein the individual identifier is provided so as to overlap the detection area.

6. The detection system according to claim 5, wherein the individual identifier comprises a bar code corresponding to the identification code.

7. The detection system according to claim 6, wherein the individual identifier comprises a position detection pattern that indicates a position of the bar code in the detection area.

8. The detection system according to claim 7, wherein the controller is configured to identify a position of the bar code by identifying the position detection pattern.

9. The detection system according to claim 5, wherein the sensor has a first surface and a second surface on a back side of the first surface.

10. The detection system according to claim 9, wherein the individual identifier is provided on the first surface.

11. The detection system according to claim 9, wherein the individual identifier is provided on the second surface.

12. The detection system according to claim 11, wherein the individual identifier is printed on the second surface.

13. The detection system according to claim 2, wherein the controller is configured to read, based on the detection values of the photosensors, the identification code defined by the individual identifier and acquire the correction value data corresponding to the identification code from the data storage.

14. The detection system according to claim 1, wherein
   the sensor comprises a light source, and
   the controller is configured to turn on the light source when biological information is detected.

15. The detection system according to claim 14, wherein the light source is configured to emit either of red light and infrared light when the biological information is detected.

* * * * *